United States Patent
Muniswamy Reddy et al.

(10) Patent No.: US 10,275,489 B1
(45) Date of Patent: Apr. 30, 2019

(54) BINARY ENCODING-BASED OPTIMIZATIONS AT DATASTORE ACCELERATORS

(71) Applicant: Amazon Technologies, Inc., Seattle, WA (US)

(72) Inventors: Kiran Kumar Muniswamy Reddy, Sammamish, WA (US); Omer Ahmed Zaki, Bellevue, WA (US); Brian O'Neill, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 15/085,957

(22) Filed: Mar. 30, 2016

(51) Int. Cl.
  *G06F 17/30* (2006.01)

(52) U.S. Cl.
  CPC .. *G06F 17/30463* (2013.01); *G06F 17/30495* (2013.01)

(58) Field of Classification Search
  CPC .................................................. G06F 17/2252
  See application file for complete search history.

(56) References Cited

U.S. PATENT DOCUMENTS

| | | | | |
|---|---|---|---|---|
| 2012/0278305 | A1* | 11/2012 | Wei | G06F 17/30433 707/713 |
| 2014/0156777 | A1* | 6/2014 | Subbiah | H04L 67/1097 709/213 |
| 2015/0100566 | A1* | 4/2015 | Ramaswami | G06F 17/30463 707/718 |
| 2017/0060912 | A1* | 3/2017 | Liu | G06F 17/3033 |

FOREIGN PATENT DOCUMENTS

| | | |
|---|---|---|
| CN | 104346433 | 2/2015 |
| WO | 2004036432 | 4/2004 |

OTHER PUBLICATIONS

U.S. Appl. No. 15/269,935, filed Sep. 19, 2016, Brian O'Neill et al.
"Amazon ElastiCache API Reference", Amazon Web Services, API Version, Feb. 2, 2015, pp. 1-169.
"Amazon DynamoDB Developer Guide", Amazon Web Services, API Version, Aug. 10, 2012, pp. 1-715.
"Amazon ElastiCache User Guide", Amazon Web Services, API Version, Feb. 2, 2015, pp. 1-303.
"My SQL::MySQL 5.7 Reference Manual:16.3.3.2 Using memcached as a MySQL Caching Layer", Retrieved from URL: https://dev.mysql.com/doc/refman/5.7/en/hamemcachedmysqlfrontend.html on Feb. 22, 2016, pp. 1-3.

(Continued)

*Primary Examiner* — Hung Q Pham
(74) *Attorney, Agent, or Firm* — Robert C. Kowert; Meyertons, Hood, Kivlin, Kowert & Goetzel, P.C.

(57) ABSTRACT

A fleet of query accelerator nodes is established for a data store. A particular node stores a binary encoding of a data item in a local data cache. The encoding identifies a metadata record indicating names of attributes of the data item. In response to receiving a particular query directed to the data item, an executable code component generated to produce a result for the query is cached in a local query code cache. When a second query which meets a matching criterion is received, the executable code component is re-used to obtain a result for the second query.

20 Claims, 23 Drawing Sheets

(56) References Cited

OTHER PUBLICATIONS

"Overview—memcached/memcached Wiki—GitHub", Retrieved from URL: https://github.com/memcached/memcached/wiki/Overview on Feb. 22, 2016, pp. 1-4.
"Using Redis as an LRU cache—Redis", Retrieved from URL: http://redis.io/topics/lrucache on Feb. 22, 2016, pp. 1-6.
"What eviction policies do you support?", Retrieved from URL: https://support.redislabs.com/hc/enus/articles/203290657Whatevictionpoliciesdoyousupport1/ on Jan. 27, 2016, pp. 1-2.
"MongoDB Documentation Release 3.2.3", MongoDB, Inc., Feb. 17, 2016, pp. 1-1068.
C. Bormann, et al., "Concise Binary Object Representation (CBOR)", Internet Engineering Task Force (IETF), RFC7049, Oct. 2013, pp. 1-54.
"The tupl Open Source Project on Open Hub", Retrieved from URL, https://www.openhub.net/p/tupl on Feb. 9, 2016, pp. 1-5.
U.S. Appl. No. 15/085,956, filed Mar. 30, 2016, Kiran Kumar Muniswamy Reddy, et al.
U.S. Appl. No. 15/085,967, filed Mar. 30, 2016, Kiran Kumar Muniswamy Reddy, et al.

\* cited by examiner

BINARY ENCODING-BASED OPTIMIZATIONS AT DATASTORE ACCELERATORS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Similarly, a single physical storage device may be used to store data objects/items of several different customers, e.g., in respective virtualized storage containers.

Some service providers have built sophisticated multi-tenant database services (as well as other types of multi-tenant storage services) using virtualized storage nodes as building blocks. By distributing the data of a given customer across multiple storage nodes, storing the data of multiple customers on a given storage node, and distributing the storage nodes across multiple physical data centers, very high levels of data durability and availability may be supported at such multi-tenant services. While multi-tenancy (the sharing of physical resources among multiple customers) may help increase overall resource utilization levels from the perspective of a service provider, some storage application users may prefer to access at least a subset of their data in single-tenant mode. Furthermore, some of the durability and availability features of the multi-tenant storage services may not necessarily be required for all versions of the data sets of some storage applications, especially if tradeoffs are possible between those features and enhanced performance levels.

Figure 1:
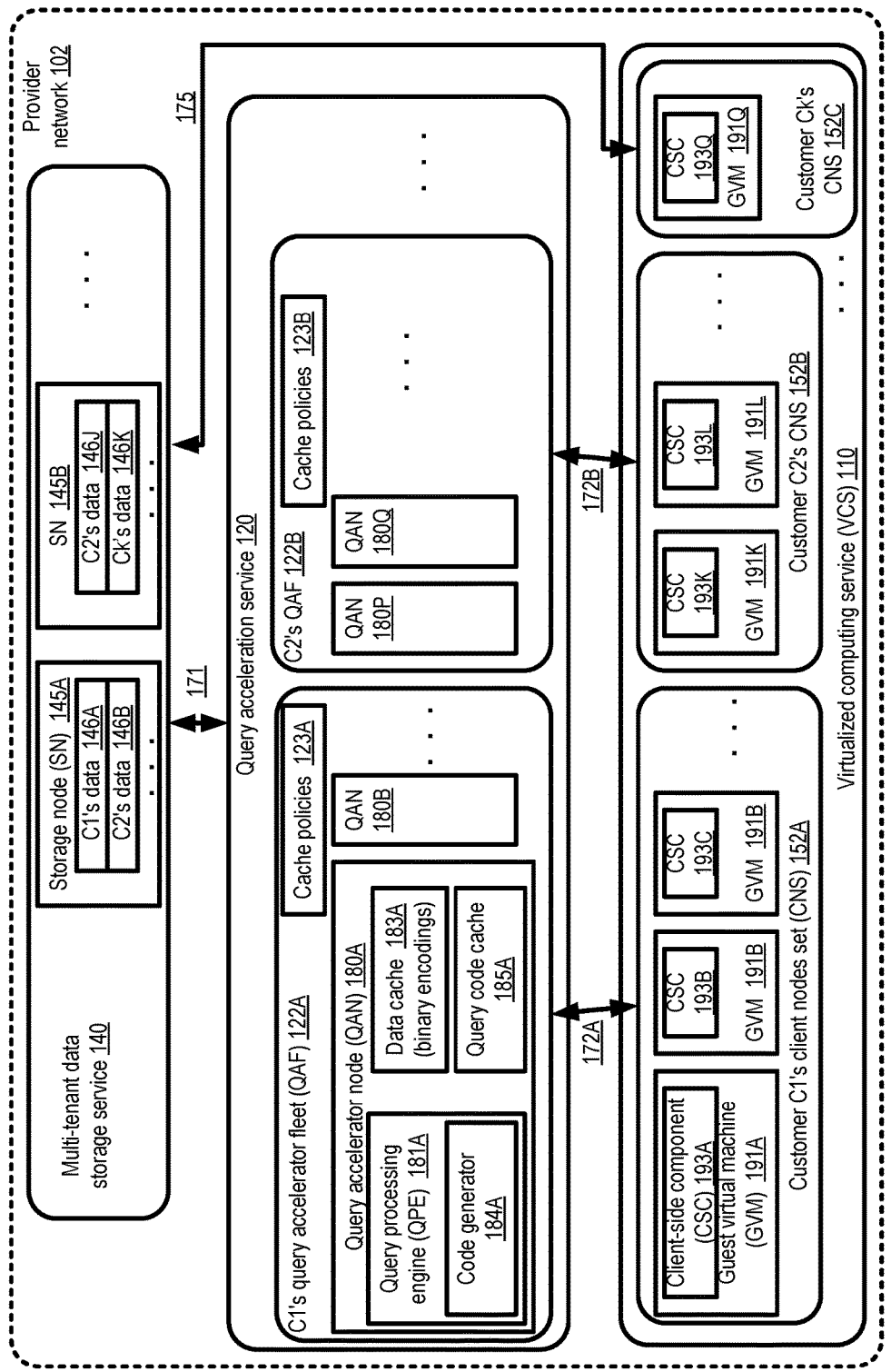
FIG. 1 illustrates an example system environment in which respective single-tenant fleets of query accelerator nodes may be established on behalf of respective clients of a multi-tenant data store, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for operations performed at query accelerator nodes associated with storage services at a provider network, including optimizations based on the use of binary encodings for data items, as well as techniques for writing data items asynchronously to the storage services, are described. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. In some provider networks, a multi-tenant virtualized computing service as well as one or more multi-tenant storage services may be supported. Using such services, customers may, for example, acquire a set of virtual machines from the virtual computing service, store various data sets at storage devices of selected storage services, and use the virtual machines to run applications that access the data sets. A given resource (e.g., a storage device or a computing device) of a multi-tenant service may at least in principle be utilized for operations performed on behalf of multiple customer accounts.

A variety of storage services may be implemented at a single provider network in some cases. In one embodiment, for example, the storage services may include a non-relational ("NoSQL") database service, a relational database service, and/or an object storage service in which unstructured objects of arbitrary size may be stored and accessed using web-service interfaces. Each of the storage services may comprise respective pools of storage, computing and networking resources, which may in some cases be managed separately from the resources of the virtualized computing service. For example, in one implementation a separate logical partition of the provider network may be used for a given storage service than is used for the virtualized computing service, or the computing devices used for a given storage service may be physically segregated (e.g., in different data center rooms or racks) from the computing devices used for the virtualized computing service. A storage service may provide high levels of availability and data durability, e.g., by partitioning data sets across multiple multi-tenant storage nodes (each of which in turn may comprise various physical storage devices), replicating partitions across data centers, and so on. A given storage service may be used to create multiple instances of data stores set up for respective applications and/or respective customers—e.g., instances of relational databases, instances of non-relational databases, or groups of storage objects may be created. The term "data store", as used herein, may refer to a collection of data items (e.g., database tables, indexes, binary objects, and the like) with an associated namespace (e.g., a database name or an object/item collection name) established on behalf of one or more customer accounts of one or more storage services. The terms "data item" and "data object" may be used synonymously herein.

According to one embodiment, a provider network may comprise a query acceleration service which may be used as an intermediary between a storage service (or several storage services) and computing devices hosting components of applications that utilize data sets stored at the storage service(s). Using such an intermediary query acceleration service, for example, a single-tenant fleet of query accelerator nodes may be established on behalf of a given customer of a storage service to help speed up I/O operations of one or more storage applications of the customer. A query accelerator node may comprise a local cache (implemented, for example using some combination of volatile and/or non-volatile memory) at which at least a subset of an application's data set may be stored at a given point in time, as well as a query processing engine configured to respond to I/O requests received from client-side components of storage applications. A client-side component may, for example, comprise one or more processes running at a virtual machine instantiated on behalf of a particular customer of the provider network, and may issue I/O requests formatted according to application programming interfaces of a storage service of the provider network. A given fleet of query accelerator nodes may be termed "single-tenant" in that the nodes may be allocated for use by client-side components associated with a single client account in various embodiments. For example, the control plane (administrative component) of the query acceleration service may store metadata indicating that only those client-side components which are associated with the customer account may be permitted to access the query accelerator nodes of the fleet, and an authorization management component of a query accelerator node may reject requests or communications which do not originate at such client-side components. In at least one embodiment, query accelerator nodes may be configured in multi-tenant mode—e.g., a customer on whose behalf the node is initially established may request that client-side components associated with other customer accounts be permitted to use the node. In one embodiment, a storage service for which a query accelerator fleet is configured may support single-tenancy—e.g., at least some storage nodes and/or other components of the storage service may be designated for exclusive use by a single customer.

In some embodiments in which the storage service and the virtualized computing service are implemented in separate logical partitions of the provider network, at least some of the query accelerator nodes may be implemented within the logical partition of the provider network which is also being used for the virtualized computing service. As a result, the query accelerator fleet may be located "nearer" to the client-side components, at least from a networking perspective—for example, on average fewer network links may have to be traversed form communications between client-side components and the query accelerator nodes than have to be traversed for communications between the client-side components and the storage nodes of the storage service. In some cases, a placement manager component of the query acceleration service may select the physical locations (e.g., racks, rooms, or data centers) at which query accelerator nodes are established on behalf of a customer based on proximity with respect to the virtual machines established for the customer—e.g., the query accelerator nodes may be physically located relatively near the hosts at which the customer's virtual machines run. In various embodiments, as suggested by the use of the term "accelerator", client requests which can be fulfilled by either the query accelerator fleet alone or the storage service alone may typically be fulfilled more rapidly by the query accelerator fleet than by the storage service. This performance difference may typically hold regardless of whether separate logical partitions of the provide network are used for the storage service than for the virtual computing devices, and regardless of the specific placement of various devices involved in I/O request handling. In some embodiments, at least some client-side components may run at devices outside the provider network (e.g., in a customer data center or customer office premises), and requests issued from such external components may also benefit from the enhanced performance enabled by a query accelerator fleet.

In addition to the performance gains made possible by the proximity of the accelerator fleet to the client-side components, additional performance benefits may be achieved in at least some embodiments by storing data items using binary encodings at the query accelerator nodes and implementing a number of shortcuts or optimizations for various types of operations using such binary encodings. In one embodiment, a storage service for which a data accelerator fleet is configured may store data items (e.g., records of non-relational or relational database tables) in text format or some other non-binary format, different from the format used at the query accelerator layer. In some implementations, a version of JSON (JavaScript Object Notation) may be used as the text encoding format at some or all data stores of the storage service, for example, while a version of CBOR (Concise Binary Object Representation) similar to that defined in RFC (Request For Comments) 7049 of the Internet Engineering Task Force (IETF) may be used as the binary format at the query accelerators.

Enhanced client-side components of the storage service may transform data items into the binary encoding format before submitting them to the query accelerator layers in some embodiments. The data items may be cached at the accelerator layer with minimal or no transformations and little or no type checking or other verifications. As a result, the amount of processing cycles required for a read or write may be reduced, relative to scenarios in which data items are processed in text format and/or scenarios in which an entire object graph of the data item is generated for the read or write.

In at least one embodiment, metadata indicating the top-level attributes of a collection of data items which share a common set of attributes may be stored separately from the binary encodings of the data items themselves at the query accelerator nodes. The metadata entry may indicate the names of the top-level attributes and the order or relative positioning of the attributes within the binary encodings of the data objects. The binary encoding of a data object may include an identifier of (or a pointer to) the corresponding metadata entry; as a result, the names of the top-level attributes may not have to be stored in the binary encodings themselves, which may result in substantial space savings in some cases.

When a query is received from a client-side component at a query accelerator node, in at least some embodiments executable code may be generated for obtaining the results of the query from the locally-cached binary encodings of data objects (if such code is not already present at the query accelerator node as a result of a similar previous query). The executable code may be stored in a query code cache so that it may, for example, be re-used for subsequent queries with matching or similar sets of query predicates and similar types of targeted data items. In one embodiment, a given executable code module for a query may be associated (e.g., via an index) with the combination of (a) a normalized or canonical representation of the query and (b) one or more top-level attribute list metadata entries indicating the data items to which the code is applicable.

The cached data items may be transformed (e.g., either at the query accelerator nodes or at the storage service itself) into the appropriate format for storage at the back-end storage service. When a data item is retrieved from the back-end storage service into a cache at a query accelerator node, its binary encoding may be generated for use at the accelerator node. Generally speaking, in at least some embodiments encoding and decoding transformations may be performed when data items are transmitted between the back-end storage service and the query accelerator layer, and also when data items are transmitted between the query accelerator layer and the client-side components. A number of different types of operations, such as projection-type queries, data item comparisons, multi-attribute queries and the like may be performed significantly more efficiently using the binary encodings than if non-binary encodings were used, as discussed below in further detail. The advantages gained by using the binary encoding format at the accelerator nodes may outweigh the overheads associated with the encoding and decoding for at least some types of workloads.

In various embodiments, for at least some data sets, the storage service may serve as the authoritative source of the data, while the query accelerator fleet nodes may be considered temporary containers of (in some cases potentially stale) versions of the data. The data stores containing the authoritative versions of the data may be termed back-end data stores, while the query accelerator nodes may be termed part of a middleware layer of the overall system used for storage applications. Several different types of policies may be enforced for managing the flow of data among client-side components, query accelerator nodes, and the back-end data stores in various embodiments, as described below in further detail. Such policies may govern, for example, the manner in which read and write requests from client-side components are distributed among different query accelerator nodes, how writes are handled (e.g., whether writes from client-side components are propagated synchronously or asynchronously to the back-end), how read misses are handled, and/or how evictions of data items from the local caches of the query accelerator nodes are handled.

Each query accelerator node of a given fleet may be assigned one of two roles in some embodiments. One or more nodes may be designated as "master" nodes at a given point in time, while the remainder of the nodes may be designated as "non-master" nodes. Writes may be directed to master nodes from client-side components, while reads may be directed to either master or non-master nodes in such embodiments. According to one embodiment, a master node may be responsible for propagating replicas of data items to non-master nodes (e.g., either a subset of non-master nodes, or all non-master nodes) and for coordinating back-end writes. For example, if a master node obtains a data item (either as a result of a write request from a client-side component, or from a back-end data store as a result of a read request which resulted in a cache miss at the master), it may store the data item (in its binary format) in its local cache and initiate replication of the data item at one or more non-master nodes. In one implementation, if there are N non-master nodes and one master node in a given fleet, the master may transmit N messages containing replicas of the data item, one message to each non-master. In another implementation, the master may transmit M messages (where M is less than N), one each to M of the non-master nodes, and the non-master nodes may propagate the replicas to remaining nodes. In some embodiments, a data item may not necessarily be replicated to all the nodes of the fleet. Upon receiving a replica of a data item replica DI1, a given query accelerator node may store DI1 in its local cache, and respond to subsequent requests for DI1 (or for a collection of data items which include DI1) using the locally-cached replica. In some embodiments, instead of designating a subset of nodes as masters configured to handle writes as well as reads, all nodes of a fleet may handle writes as well as reads.

In various embodiments, regardless of whether master or non-master roles are assigned, the nodes of a given query accelerator fleet may differ from one another in various capabilities and characteristics. For example, the local caches of different nodes may differ in total size, or in the types of devices used for the local caches. Some nodes may use volatile memory (e.g., the "main" memory of a computing device) alone for their local caches. Other nodes may use a combination of volatile and non-volatile storage—e.g., main memory plus a solid state drive (SSD), main memory plus a magnetic rotating disk-based device, or main memory plus an SSD plus a rotating disk device. In one implementation, some nodes may utilize only non-volatile storage for their caches. In one embodiment, at least one query accelerator node may utilize a network-attached storage drive for a portion of its local cache, e.g., if the latency for accessing the network-attached storage is smaller than the latency for accessing the back-end data store.

A number of different criteria may be used to determine when or if a given data item is to be evicted from a given query accelerator node's local cache, or to select a replacement victim when the cache becomes full and space has to be freed to store another data item. For example, in one embodiment a time-to-live (TTL) based approach may be used, in which a maximum duration for which a given data item is to remain cached (called the TTL of the item) is selected, and the item is evicted when that duration expires. If all the cache entries have unexpired TTLs and space has to be freed for a new entry, the entry with the shortest remaining TTL may be selected as the replacement victim and evicted. In other embodiments, an LRU (least-recently-used) approach may be used, in which the cache entry which has not been accessed for the longest duration among the currently cached entries may be selected as an eviction victim. In one embodiment, eviction victims may be selected based at least in part on other criteria—e.g., based on the size of the entry in scenarios in which different cache entries have different sizes, based on characteristics of the client-side component on whose behalf the data item is cached, based on locality with respect to other data items that are currently cached, and so on. Some client-side components may be assigned higher priority than others, for example, and a data item cached on behalf of a high priority client may be retained in the cache while a data item cached on behalf of a low priority client may be evicted. In one example of locality-based eviction criteria, a data item DI1 may be retained in the cache in preference to a different data item DI2 if DI1 is part of a larger collection of objects (such as if DI1 is a record of a table T1) which is currently being accessed or expected to be accessed in the near future. Combinations of such criteria may be used in various embodiments, and different query accelerator nodes may utilize different criteria in at least some embodiments.

According to at least one embodiment, a given query accelerator node of a fleet may evict a data item from its local cache independently of other nodes—e.g., without synchronizing the eviction with other nodes and without notifying any other node. Consider a scenario in which a query accelerator fleet comprises nodes N1, N2 and N3. If node N2 decides, based on eviction criterion EC1, that a data item DI1 is to be evicted from its local cache, and N2 is required to notify other nodes regarding the eviction, this may require a minimum of two messages (one to N1 and one to N2). If all the nodes have to synchronize their evictions (that is, if N1 and N3 also have to evict their copies of DI1 and verify that they have done so), this may require even more messages (e.g., acknowledgements may have to be sent indicating that the local evictions have been performed at each node), depending on the implementation. In contrast, if each node is allowed to evict data items without notifying other nodes and without strict synchronization, this may reduce network traffic, which may reduce network bandwidth consumption. In the above example, if N2 is allowed to evict DI1 independently of the other nodes, and N3 happens to retain a replica of DI1, N3 may be able to fulfill a read query from its local cache even after DI1 has been evicted from N2's cache. Of course, at some point in time, N3 and/or N1 may also evict their copies of DI1, e.g., on the basis of different eviction criteria as used at N2 (or the same eviction criterion).

In at least some embodiments, executable modules corresponding to various queries which are cached in local query code caches may also be evicted independently at different query accelerator nodes of a given fleet—e.g., code for a particular query Q1 may be replicated at several different nodes, and removed/replaced from one node without synchronizing the removal with other nodes. Such independent and asynchronous evictions of data items, query execution code modules, or both data items and query execution modules, may be especially well suited to environments in which different query accelerator nodes have caches (and/or query processors) with different capabilities or sizes, and/or in scenarios in which the workloads of the nodes differ from one another. In order to be compatible with un-synchronized local caches, the applications on whose behalf the query accelerators are set up may be designed with the appropriate consistency models in various embodiments—that is, an application may not require that the state of all the local caches is identical at any given point in time with respect to any given data item. In some embodiments, at least a subset of the nodes of a fleet may be configured to synchronize their cache evictions with one another, or to notify one or more other nodes when they evict a data item from their local caches. In some embodiments, master nodes may apply different eviction policies (with respect to synchronization and/or notification) than non-master nodes with respect to data items, query code, or both data items and query code.

In addition to the types of read/write distribution policies (which control whether some nodes are only permitted to handle reads, or whether all nodes can handle writes) and eviction policies (which govern how, and how independently of each other, cached data items are evicted or removed), a number of different policies or rules regarding read miss handling (which govern the operations performed when a read request which cannot be satisfied from a local cache) may be enforced in various embodiments. In one embodiment, for example, in which a fleet comprises master and non-master nodes, a read miss for a data item DI1 at a non-master node NM1 may result in a request for DI1 being sent to the master node M from NM1. According to other read miss handling policies, a request for the missing data item may be sent directly to the back-end data store instead of to a master node, or a request may be sent to one or more non-master nodes instead of to a master node. Furthermore, in some embodiments a read miss response may be accompanied by the propagation of the data item to other nodes—e.g., the master node may send a replica of the data item to non-master nodes which did not request the data item, under the assumption that reads for that data item are likely to occur again relatively soon. In embodiments in which the query accelerator nodes operate relatively independently of one another, it may sometimes be the case that a cache miss for the same data item may be handled using distinct miss handling rules at two different nodes—for example node N1 may obtain the missing data item from the back-end data store, while node N2 may obtain the missing data item from another node of the fleet.

In at least one embodiment, the client-side components may comprise intelligent routing modules which enable particular query accelerator nodes to be targeted in preference to others, at least for certain types of requests. For example, metadata indicative of the differences among the query accelerator nodes (e.g., non-uniform cache sizes, different cache storage device types, etc.) may be available to the intelligent routing modules. Based for example on an examination of the predicates of a given read query which is to be transmitted to the query accelerator layer, and on the available metadata, an intelligent router may determine that the probability of being able to obtain a response quickly from the cache at a particular node N1 is greater than the probability of being able to obtain a response equally quickly from the cache at a different node N2. Consequently, the intelligent routing module may direct the query to N1 rather than to N2 in such a scenario. In some embodiments, different subcomponents of the application may direct their I/O requests to respective subsets of the query accelerator fleet—e.g., if an application accesses two database tables T1 and T2, query accelerator nodes N1 and N2 may be used primarily for requests directed to T1, while query accelerator nodes N3 and N4 may be used primarily for requests directed to T2. In at least some scenarios, using intelligent routing based on such partitioning of data sets and/or based on the differences in local cache metadata may enable better overall performance than if uniform or random routing were used.

At least some of the query accelerator nodes may comprise intelligent query processing engines capable of recognizing and responding to certain types of queries, e.g., by processing a collection of cache entries which were stored in the cache to prepare responses to different queries earlier. For example, consider a scenario in which a read query Q1 with query predicates P1 and P2 is received at time T1 at a particular query accelerator node N1. To prepare the response R1 to Q1, a set of data items DIS1 with data items DI1, DI2, DI3, . . . , DI10 may be retrieved, e.g., from a back-end data store, and place in N1's local cache. Later, a different query Q2 with a predicate P3 (which differs from P1 and P2) may be received at N1. By examining the query predicate P3, the query processing engine of N1 may be able to determine that a response R2 to Q2 may be prepared using a subset of DIS1 (e.g., using DI1 and DI10). As a result, even though query Q2 appears to be different from query Q1, a response to Q2 may be prepared and provided to the requesting client-side component entirely from the local cache, without retrieving any items from the back-end storage service (or from any other node of the fleet). The query Q2 may be termed a "contained" query with respect to Q1 in some environments because the result for Q2 may be contained within the data items used to respond to Q1. Depending on the kinds of queries which make up the workload of a query acceleration fleet, query processing engines which are intelligent enough to recognize and respond to contained queries using previously-cached data may help improve overall query performance substantially in at least some embodiments.

In some embodiments, a given query accelerator fleet may be configured for a group of data stores rather than a single data store. For example, an application may access data from one instance of a non-relational database and from one instance of a relational database, and a single fleet of query accelerator nodes may be set up for the application. The query accelerator nodes of the fleet may be able to direct requests to respective back-end data stores using different query languages—e.g., a version of SQL (Structured Query Language) may be used to access the relational database, while a different query language may be used to access the non-relational database. A single query from a client-side component may sometimes be translated into several distinct back-end queries from an accelerator node in such embodiments. In one embodiment, a query accelerator fleet may be established for data stored at customer-owned premises (or other premises outside the provider network at which the query acceleration service is implemented).

Example System Environment

FIG. 1 illustrates an example system environment in which respective single-tenant fleets of query accelerator nodes may be established on behalf of respective clients of a multi-tenant data store, according to at least some embodiments. As shown, system 100 comprises respective sets of resources of three services implemented at a provider network—a multi-tenant data storage service 140, a query acceleration service 120 and a virtualized computing service 110. The virtualized computing service comprises a plurality of guest virtual machines (GVMs) 191 set up on behalf of various customers, such as customers C1, C2 and Ck. A given customer may store a respective data set of an application at some number of storage nodes (SNs) 145 of the storage service, while client-side components of the applications may issue I/O requests directed to the data sets from guest virtual machines of the virtual computing service 191 in the depicted embodiment. Thus, client node set 152A of customer C1's application includes client-side components (CSCs) 193A, 193B and 193C running at GVM's 191A, 191B and 192C respectively. Client node set 152B of customer C2 includes CSCs 193K and 193L at GVMs 191K and 191L respectively, while client node set 152K of customer Ck includes CSC 191Q at GVM 193Q. Two example storage nodes 145 are shown—storage node 145A containing a portion of customer C1's data 146A and a portion of customer C2's data 146B, and storage node 145B comprising another portion of C2's data 146J and a portion of CK's data 146K.

Customers such as C1, C2 and Ck of the storage service 140 may in general access their data sets either directly from the service 140, or with the help of a single-tenant intermediary query accelerator fleet (QAF) 122. For example, as indicated by arrow 175, customer CK's client-side components may access data directly from storage service 140. In contrast, respective QAFs 122A and 122B have been established for customers C1 and C2. Each QAF 122 may comprise one or more query accelerator nodes (QANs) 180 working collaboratively, with all the QANs of a given QAF being dedicated to a single customer's client nodes. QAF 122A comprises QANs 180A and 180B set up on behalf of customer C1, while QAF 122B comprises QANs 180P and 180Q. Each QAN 180 in turn may comprise a local data cache 183, a local query code cache 185 and a query processing engine (QPE) 181 which includes query code generator 184. For example, QAN 180A comprises data cache 183A, query code cache 185A, QPE 181A comprising code generator 184A, and so on. It is noted that at least some of the QANs of a given QAF may differ in one or more characteristics—e.g., they may have different performance capabilities, use different types of storage devices for their caches, the sizes of the local cache of either type may vary, and so on. In one embodiment, some QANs may not necessarily include local query code generators and/or local query code caches. A query accelerator fleet may be established either at the time that a customer creates a data set at the storage service 140, or at some later time in the depicted embodiment, and the number of QANs may be increased or decreased dynamically as desired. Although a multi-tenant storage service 140 is shown in FIG. 1, in at least some embodiments query accelerator fleets 122 may be established for a single-tenant storage service, or for a storage service that supports both single-tenant and multi-tenant modes.

In the depicted embodiment, data items may be stored in a different format at the storage service 140 than the format used to store entries for the items in the local data caches at the QANs 180. For example, the storage service 140 may use text encodings or text representations (such as JSON), while a binary encoding such as CBOR or the like (e.g., MessagePack, Binary Javascript Object Notation (BSON), or Universal Binary Javascript Object Notation (UBJSON)) may be used at the QANs. When a data item is obtained at a QAN, e.g., by retrieving a text-encoded version of the item from the storage service in response to a read request from a client-side component, a corresponding binary encoding may be generated at the QAN, with the binary-encoded version rather than the text-encoded version being placed in the data cache.

In at least some embodiments, at least some data items (such as records of a database table stored at service 140) may comprise a hierarchical collection of attributes, with one or more top-level attributes and zero or more lower-level attributes (with a lower-level attribute being logically contained within a higher-level attribute such as a top-level attribute). A metadata entry indicating the names of the top-level attributes for a set of data items, and the relative ordering or positioning of the top-level attributes, may be generated at the QAN in some embodiments. The metadata entry may be stored separately from the binary-encoded representations of the individual data items—e.g., as a separate entry in the local data cache or as an entry in a separate metadata cache. The binary encodings of the data items may include pointers to (e.g., identifiers of) the corresponding metadata entries. Consider a scenario in which each data item of a set of data items DIS1, which includes individual data items DI1 and DI2, comprises values for three top-level attributes with names "TLAttr1", "TLAttr2" and "TLAttr3". A metadata entry ME1 containing strings corresponding to the names "TLAttr1", "TLAttr2" and "TLAttr3" may be created for the set DS1. ME1 may indicate that at least within the binary encodings of the data items of DS1 such as DI1 and DI2, the values of the top-level attributes are stored in the order "TLAttr1" followed by "TLAttr2" followed by "TLAttr3". The binary encodings of DI1 and DI2 may each include a pointer to ME1 (e.g., a unique identifier assigned to ME1), and the values of the top-level attributes in the order indicated in ME1, but need not contain the strings indicating the names of the to-level attributes. As a result of not replicating the name strings in each data item's binary encoding, significant space savings may be achieved for at least some data sets at the QANs. When the contents of a given cached data item are to be examined, the corresponding metadata entry may be retrieved to determine the names of the top-level attributes. In some embodiments, the names of lower-level attributes may also be similarly stored in metadata entries, achieving even greater space savings. It is noted that at least in some embodiments, variable-length attributes may be supported, and the lengths of the attributes may be included in their binary encodings as described below.

When a read query or request is received from a client-side component 191 at a QAN 180, the query processing engine (QPE) may first convert the query into a normalized or canonical form in the depicted embodiment. The local query code cache 184 may be searched for a matching query code entry (e.g., using a key whose elements include the normalized version of the query and/or the identifier of the top-level-attribute metadata entry of the targeted set of data items) to determine whether executable code which can be used to obtain the results of the most recently-received query is present. If such code is not present, the code generator 184 may produce executable code for manipulating the binary encodings of the data items in the cache to obtain the query results, and run the code to obtain a response for the client-side component. A copy of the executable code may be inserted into the query code cache for at least some queries, so that, for example, if the same kind of query (e.g., a query with a similar predicate set and similar types of target data items) is received again, the code may be re-used from the cache instead of being generated again. In some implementations, query code may be replicated at several QANs of a given QAF 122, e.g., in a manner similar to the way that data item entries are replicated in respective QAN caches, so that repeat queries can be responded to even more quickly from other QANs. When a query which meets a matching criterion with respect to an earlier query for which code was generated is received at a given QAN 180, and code for that query is found in the local query code cache, the code may be executed to respond to the matching query. The code generated at the QPEs such as 181 may take advantage of the simple compact representations used for the binary encodings (which are discussed in further detail below) to optimize various types of queries, including for example projection-type queries, multi-attribute queries, comparison queries, and the like. In addition, in at least some embodiments in which secondary indexes are supported for data item collections as described below, code may also be generated to automatically create secondary index entries corresponding to data item modification or creation.

Client-side components 191 may initially prepare read and write requests according to a query language or data manipulation language (DML) of the data storage service 140 in some embodiments. The requests may be submitted to the storage service directly (as in the case of the CSC 193Q), or to a selected QAN 180 of the submitter's QAF 122, as in the case of the client-side components of C1 and C2 in the depicted scenario. In some embodiments, at least some requests sent to the QANs from the client-side components may be expressed in terms of the binary formats of data items—e.g., a binary encoding of a to-be-inserted data item may be prepared at the client-side component before the corresponding insert request is sent to a QAN 180. If a given request can be fulfilled using the contents of the local cache at the QAN 180 which receives the request, a response may be generated by the QPE of the QAN and sent back to the requester (as indicated by arrows 172A and 172B). For some requests, data items may have to be retrieved from the storage system 140 and/or written to the storage system 140 (as indicated by arrow 171), depending on the policies in use at the QAN. Such transfers may involve encoding or decoding the data in embodiments in which different encodings are used for data items at the QANs than at the storage service. A customer may transition from using direct-to-storage-service accesses to using a query accelerator fleet 122 dynamically in the depicted embodiment—e.g., a QAF may be established after a customer has been using the storage service for a while. Similarly, if a customer wishes to stop using the query acceleration service, the customer may disable a QAF 122 and start (or resume) accessing the storage service directly.

The QAFs set up on behalf of different customers may enforce respective sets of cache-related policies 123 (e.g., policies 123A of QAF 122A, and policies 123B of QAF 122) governing various aspects of read and write operations in the depicted embodiment. For example, a control-plane component of the query acceleration service 120 may enable customers to submit QAF establishment requests which specify the rules to be used to distribute reads and writes among QANs, the rules to be used for evicting data items and/or query code modules from the local caches, the manner in which writes are to be handled at the QANs, and/or the manner in which misses in read caches are to be handled (i.e., the data sources from which missing data items are to be retrieved to populate the caches). In some embodiments, for example, one or more of the QANs 180 of a QAF may be designated to handle writes (as well as read queries) from the CSCs 193, while other QANs may be configured to handle only read queries. The node(s) responsible for writes as well as reads may be termed "master" nodes, while the remaining node(s) may be referred to as non-master node. When a master node obtains a data item, e.g., as a result of a write operation or in response to a read miss in the local cache, it may cache a binary encoding of the item locally and propagate respective replicas of the item to one or more non-master nodes (or all non-master nodes) in some implementations. The non-master nodes may store the replicas in their respective caches (after potentially evicting other cache entries if there is insufficient space in their caches). Subsequently, read queries directed to that data item may be fulfilled from any of the nodes whose local caches have a replica of the data item.

A number of different criteria or rules may be used to evict data items from QAN caches in the depicted embodiment. For example, data items may be selected for eviction based on their remaining TTL (time to live), based on how recently the items have been accessed (e.g., in accordance with an LRU replacement policy), based on the size of the new item to be added to the cache relative to the size of the candidate eviction victims, based on a relative priority associated with the CSC on whose behalf the item was cached, and/or based on the whether a given data item (e.g., a database record) is part of a larger collection (e.g., a database table) expected to be accessed shortly or currently being accessed. A given QAN 180 may evict, replace or overwrite a selected data item without necessarily synchronizing that eviction with any other QAN, or even without notifying any other QAN 180 in the depicted embodiment. Thus, it may be the case that at some time T1, each QAN in the QAF has a copy of a data item DI1, while at some later time (T1+delta1), the data item has been evicted from some QANs of the QAF and remains at other QANs of the QAF. Responses to read queries directed to the data item may continue to be provided using the locally-cached replicas from those nodes at which replicas remain in the caches. Each QAN may thus evict data items asynchronously with respect to, and independently of, other QANs of the QAF in at least some embodiments. Similar asynchronous evictions may also be implemented at respective query code caches 185 of the different QANs 180 in at least some embodiments—e.g., not all the query code caches may comprise the same set of query code modules at a given point in time.

The policies 123 may also include rules for selecting the sources (or the order in which different possible sources are accessed) from which data items are to be brought into the local caches at a QAN to respond to a cache miss. For example, according to one rule, a QAN may directly request the missing data item from a storage node 145, while according to a different rule, the missing data may be requested from other non-master nodes, or only from the master node. In some cases, a miss for the same data item may be handled using different rules at two different QANs of the same QAF—e.g., one QAN may retrieve the missing item from the master node, while another may retrieve it from a non-master node. In at least one embodiment, query code may also be retrieved from other QANs in the event that a miss occurs in the local query code cache.

The potential heterogeneity of the caching policy rules, and the potential non-uniformity of the QANs 180 of a given QAF 122, may enable highly customized caching for certain kinds of applications in the depicted embodiment. For example, one set of caching policies may be enforced (using a particular subset of QANs) for a particular subset or partition of a data set, while a different set of caching policies may be enforced for a different subset of the data. In some cases, intelligent routing subcomponents of the client-side components 193 may be able to use metadata about the QAN caches to select the particular QAN to which a given query should be directed, e.g., so as to maximize the likelihood of being able to obtain a response using cached data items and/or cached query code. Intelligent routing subcomponents may even transmit some requests directly to the storage service 140, while sending other requests to the QAF. The QAN caches may be termed "transparent" caches in the depicted embodiment, as the client-side components may utilize the same APIs whether they access data items directly from the back-end storage service or from the accelerator layer. In contrast, some other commonly-used caching techniques may require a separate set of cache-specific APIs to be used, and may also require users to perform cache management operations instead of relying on the query acceleration service 120. If the QAFs 122 are established in single tenant mode, the operations performed at the QANs may only affect a single customer's application—e.g., even if a suboptimal caching policy is used or if the customer's request sequence results in thrashing (frequent cache misses), this would not impact any other customer. Customers may resize their QAFs—e.g., by adding new QANs or disabling currently-configured QANs—dynamically in the depicted embodiment, with little or no impact on the caching performance achieved by other customers. In one embodiment, QAFs may be set up for data sets that are stored outside the provider network—e.g., data items stored in databases at customer premises (or in third-party data centers owned by entities other than the provide network operator or the customer) may be read into QAN caches and processed in response to client-side requests, and writes submitted by client-side components may eventually be propagated to storage devices located at the external data stores.

Figure 2:
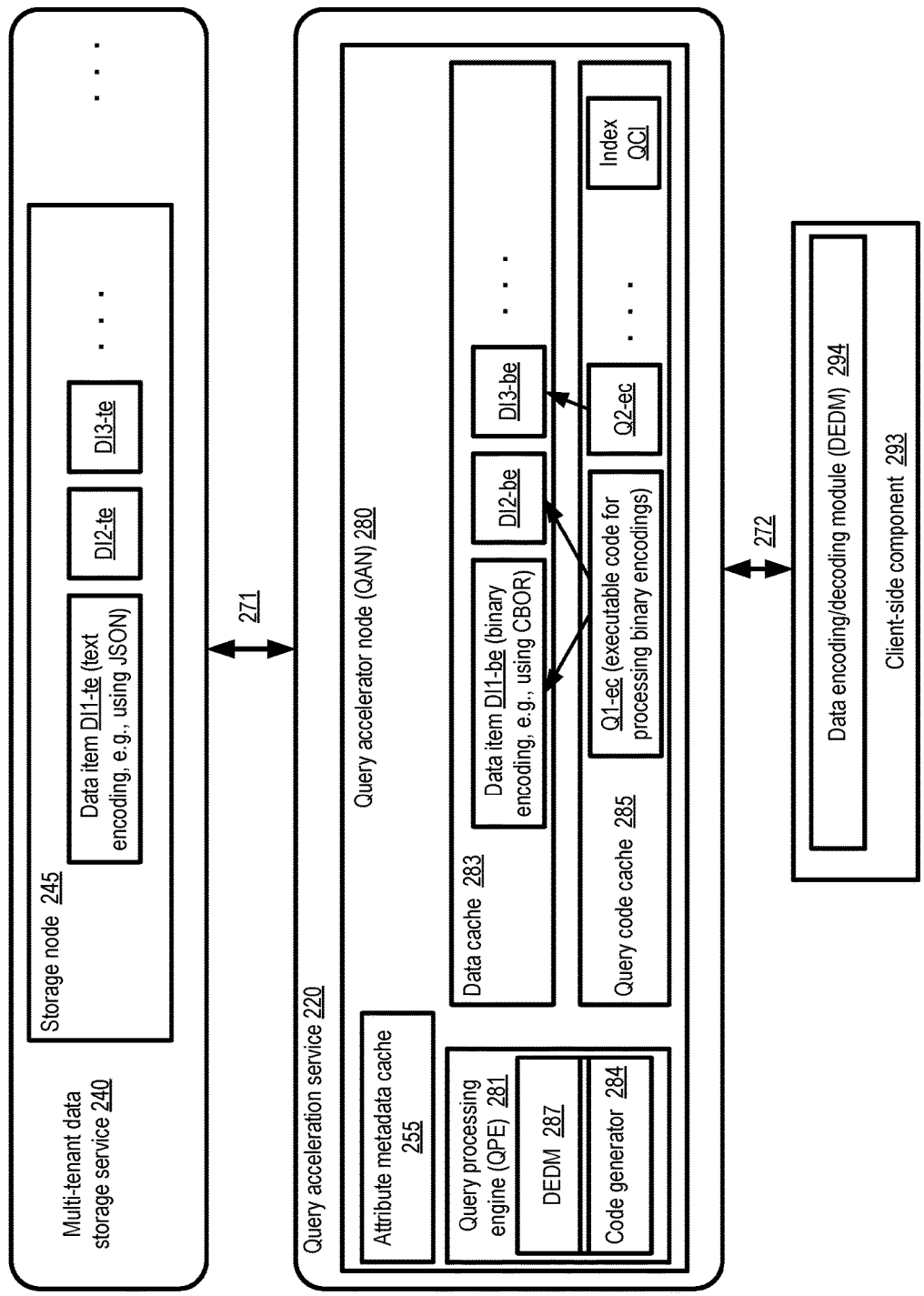
FIG. 2 illustrates a query accelerator node at which binary encodings of data items are stored in a local data cache, and executable code corresponding to client-submitted queries is stored in a local query code cache, according to at least some embodiments.

FIG. 2 illustrates a query accelerator node at which binary encodings of data items are stored in a local data cache, and executable code corresponding to client-submitted queries is stored in a local query code cache, according to at least some embodiments. In the depicted embodiment, a storage node 245 of a multi-tenant storage service 240 comprises respective text encodings DI1-te, DI2-te and DI3-te of three data items. Client-side component 293 of the storage service 240 includes a data encoding/decoding module (DEDM) 294, which transforms read and write requests into a binary format supported at the query acceleration service 220. Query accelerator node 280's processing engine 281 also comprises a data encoding/decoding module 287, in addition to a code generator 284 in the depicted embodiment. Write requests submitted from the client-side component 291 may include binary-encodings of the data items being written, prepared by the DEDM 294. In contrast, if the client-side component issues a write directly to the storage service, encoding of the write into binary format may not be required in the depicted embodiment. When a data item is retrieved from the storage service 240 in text format (as indicated by arrow 271), the DEDM 287 may transform it into a binary format before placing it in the data cache 283. Respective binary encodings DI1-be, DI2-be and DI3-be in cache 283 correspond to text encodings DI1-te, DI2-te and DI3-te.

Consider a scenario in which the data items DI1, DI2 and DI2 each comprise the same set of top-level attributes. When the first of the three data items is obtained at the QAN 280 (e.g., either from the client-side component as part of a write request 272, or from the storage service 240 in response to a read miss), a metadata entry may be generated to represent the top-level attributes of the data items. The metadata entry (which may be stored in a separate attribute metadata cache 255 and/or the data cache 283 itself) may include the names of the top-level attributes and the order in which the attribute contents are stored in the binary encodings. In some embodiments the attribute metadata entry may be replicated at one or more other QANs. When a read query Q1 directed to data items DI1, DI2 or DI3 is received from the client-side component at QAN 280, the query code cache 285 may be searched to determine whether a code entry for the query is already present in the cache. If such an entry is not found, an executable code module Q1-ec may be produced by the code generator 284 and inserted into the cache. Q1-ec may include executable instructions to identify and manipulate the binary encodings of the targeted data items in the depicted embodiment. A query-code-related metadata entry may also be inserted into query code index QCI in some implementations, indicating that Q1-ec corresponds to a normalized version of query Q1 and indicating the metadata entry generated for the data items targeted by the query. The index entry, which identifies the combination of (a) the query whose code is cached and (b) the set of data items to which the query code applies (i.e., items with a common set of top-level attributes and a common ordering of top-level attributes), may be placed in a different cache in some embodiments. A query code index may be implemented using a variety of techniques in different embodiments, such as for example using a B-tree variant, a hash table, and so on. Subsequent queries which meet one or more matching criteria with respect to Q1 (e.g., criteria expressed in terms of the attributes for which query predicates are included in the queries, and the set of attributes of the data items targeted by the queries) may be satisfied by re-using Q1-ec. For example, in one embodiment executable code for a query QA may be re-used for a different query QB if (a) the normalized versions NQ-A and NQ-B of two queries QA and QB comprise the same query predicates, and if (b) QA and QB are both directed to data items with the same metadata entry indicating the data items' top-level attribute list. Similar modules Q2-ec etc. may be generated for other queries and stored in query code cache 285. If the workload comprises some faction of repeated queries, storing the executable code for common queries may result in much faster query processing than if each repeated query had to be processed anew in the depicted embodiment.

Separation of Top-Level Attribute Metadata

Figure 3:
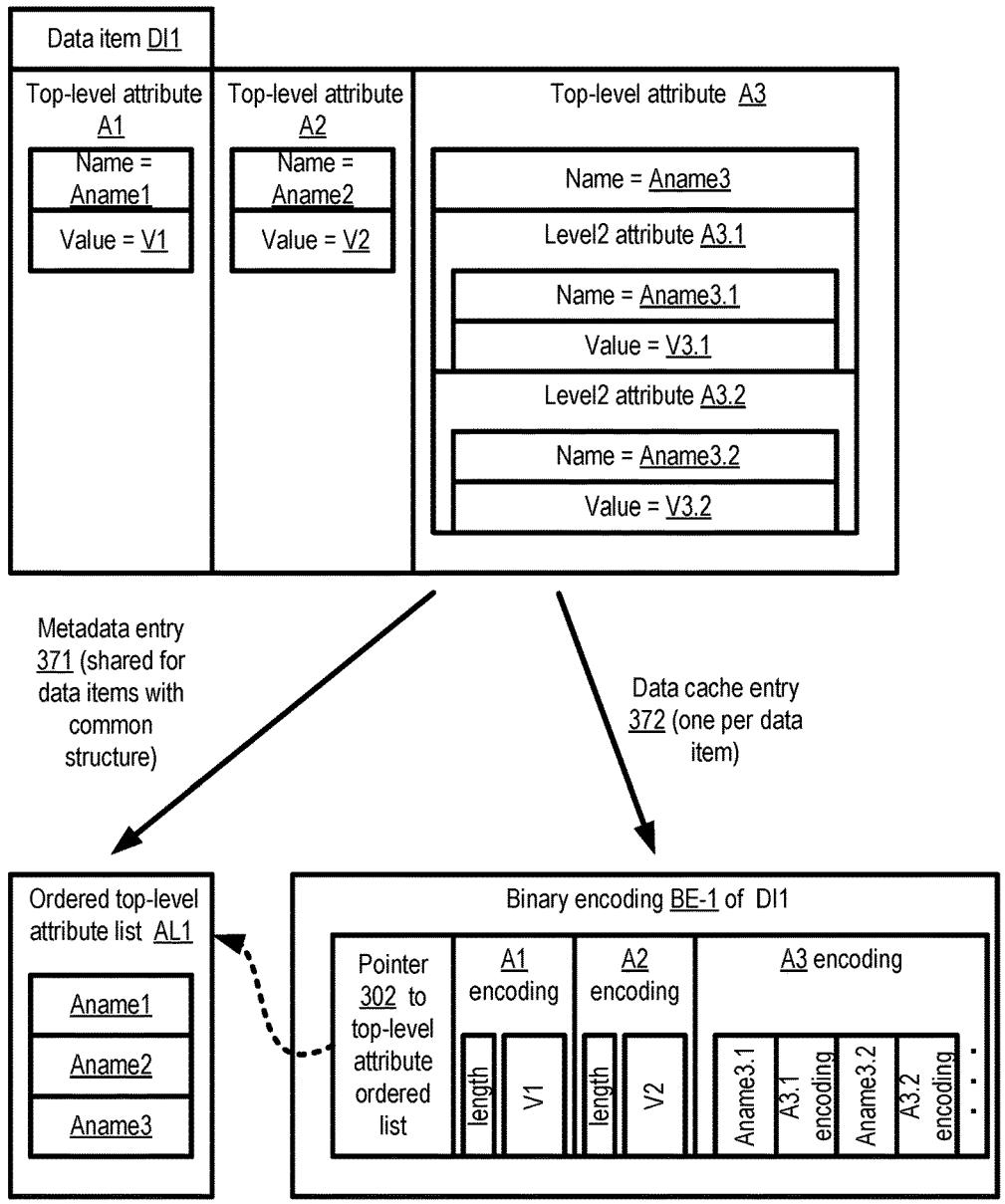
FIG. 3 illustrates an example technique for binary encoding of data items, according to at least some embodiments.

As mentioned earlier, in various embodiments a query processing engine at an accelerator node may store metadata regarding top-level attributes of data items separately from the binary encodings of the items themselves. FIG. 3 illustrates an example technique for binary encoding of data items, according to at least some embodiments. An example data item DI1 comprises a hierarchy of attributes in the depicted embodiment, including three top-level attributes A1, A2 and A3. The phrase "top-level" indicated that these attributes are not incorporated within other attributes. Attribute A3 comprises two child attributes, also called lower-level attributes, A3.1 and A3.2 in the depicted scenario. Each attribute has an associated name string and a value (which may in some cases comprise a hierarchical collection of values of lower-level attributes). For example, the strings "Aname1", "Aname2" and "Aname3" represent the names of the top-level attributes A1, A2 and A3 respectively, and the names of the two lower level attributes ate "Aname3.1" and "Aname3.2".

If DI1 is the first data item with the particular set of attributes shown in FIG. 3 encountered at a query accelerator node (e.g., as a result of retrieving the data item from a back-end data store, or as a result of a write request issued by a client-side component), two objects may be generated by the query processing engine and stored locally in the depicted embodiment. A metadata entry AL1 comprising an ordered list of the names of the top-level attributes may be produced (where the ordering represents the sequence in which the values of the attributes are stored). In addition, a binary encoding BE-1 of DI1, which does not include the top-level attribute names itself, may be produced. BE-1 may include a pointer 302 to (e.g., an identifier of) AL1 so that query execution code examining BE-1 may be able to determine the names and ordering of the top-level attributes. In the depicted embodiment, the pointer to the ordered top-level attribute list metadata entry may be located at the start of the binary encoding BE-1, and may be followed by respective encodings of the top-level attributes (and any children attributes). In some implementations, as in the example shown in FIG. 3, the length (e.g., in bytes) of the encoding of each attribute may be indicated in the first few bytes of the encoding. For attributes that do not have child attributes, the length field may be followed by a value field (e.g., value V1 for A1, value V2 for A2, etc.). If the top-level attribute comprises lower-level attributes, respective encodings of the lower-level attributes (including the names of the lower-level attributes in the depicted implementation) may be included within the encoding of the top-level attributes. Similarly, if there are multiple levels in the attribute hierarchy, attributes at the third level may be encoded within the encodings of the second-level attributes, attributes at the fourth level may be encoded within the encodings of the third-level attributes, and so on. In some embodiments, instead of only including the top-level attribute names and ordering in the metadata entry AL1 names and orderings for at least some lower-level attributes may also be stored in the metadata entry.

The metadata entry may be cached at the query accelerator node (e.g., either in the local data cache or in another cache) and re-used to process queries directed to data items with the depicted top-level attributes. It is noted that in at least one embodiment, re-ordering the attributes (even if the distinct set of attributes remains the same) may result in the generation of a different metadata entry. If, for example, a data item with the same set of attributes A1, A2 and A3, but with the attributes rearranged in the order A1, A3, A2 is received at the QAN, a new metadata entry may be created indicating that different order. In other embodiments, the QAN (and/or the client-side component) may rearrange top-level attributes according to some criterion (e.g., in lexicographic order of the attribute names) and construct the binary encoding after rearranging the attributes, in which case objects with different orderings for the same underlying set of attributes would not require separate top-level attribute lost metadata entries. Any of a number of different formats for binary encodings may be used in different embodiments: e.g., in some embodiments the binary encodings may be formatted according to CBOR, while in others MessagePack, Binary Javascript Object Notation (B SON), or Universal Binary Javascript Object Notation (UBJSON) may be used.

Overview of Query Processing

Figure 4:
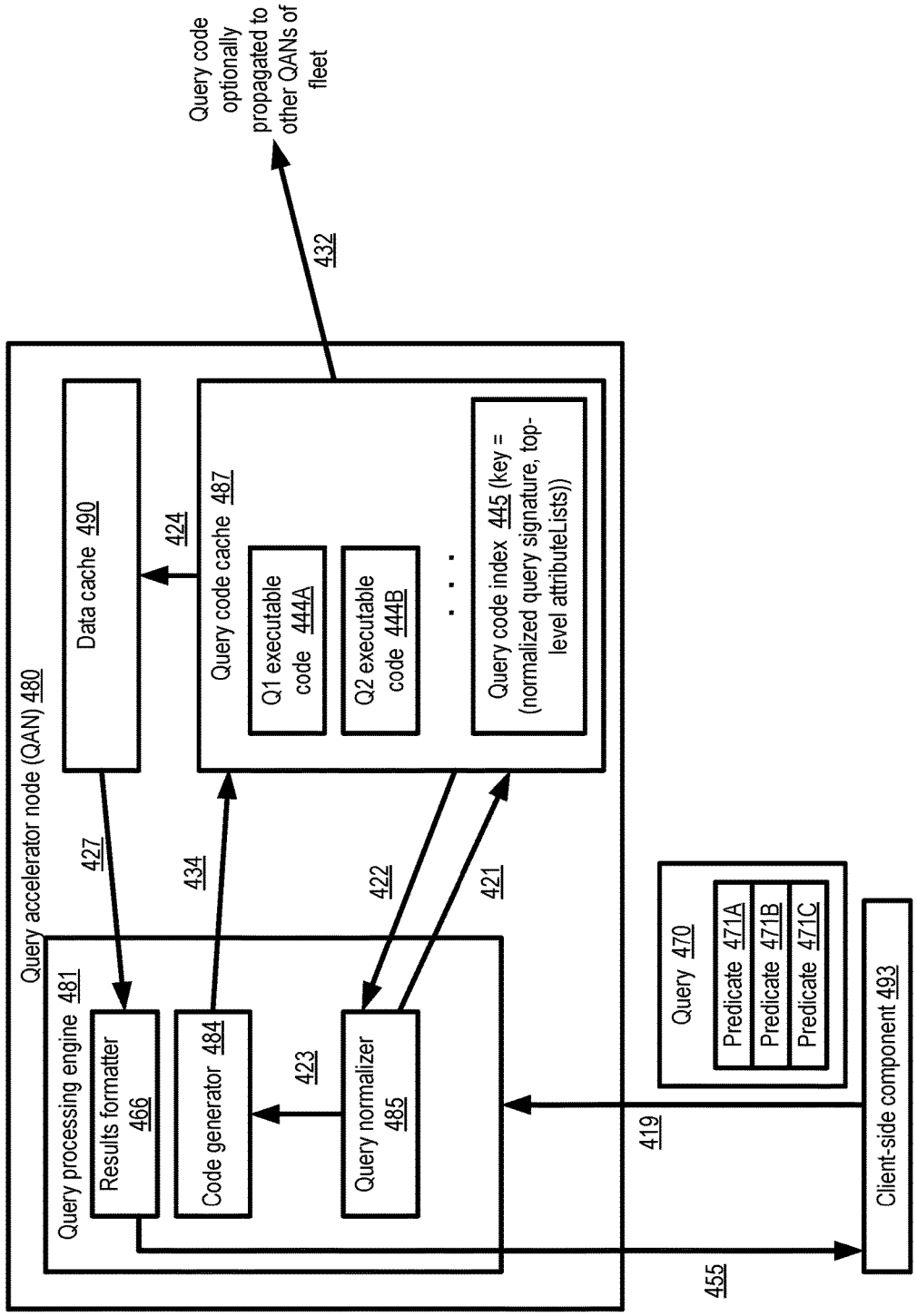
FIG. 4 illustrates example operations that may be performed in response to a query received at a query accelerator node, according to at least some embodiments.

FIG. 4 illustrates example operations that may be performed in response to a query received at a query accelerator node, according to at least some embodiments. As shown, a query 470 comprising a set of predicates (e.g., clauses similar to Structured Query Language "where" clauses) 471A-471C may be transmitted from a client-side component 493 to a query accelerator node 480. A query normalizer 485 may examine the predicates of the query 470 and rearrange them in a normalized or canonical format. In one example normalized format, a query with predicates "where Attr2=Value1" and "where Attr1 Value2" may be rearranged so that the attributes are lexicographically ordered (i.e., the Attr1 clause may be positioned prior to the Attr2 clause). Normalization may make it easier to determine whether two different queries are equivalent in their predicates, and so can be processed using the same executable code. After normalization, a query Q1 whose un-normalized version includes clauses "where Attr2=Value1" followed by "where Attr1 Value2" may be considered equivalent with regards to predicates to a query Q2 whose un-normalized version includes clauses "where Attr1=Value3" followed by "where Attr2=Value4".

Query code index 445, whose keys may include (a) representations of the normalized versions of the queries and/or (b) identifiers of the top-level attribute lists of various data item collections may be searched to determine whether an entry corresponding to query 470 is present in code cache 487, as indicated by arrow 421. If such an entry is found, the corresponding executable code module 444 (e.g., 444A or 444B) may be executed. The instructions of the query execution module 444 may examine contents of the data cache 490 of the QAN 480, as indicated by arrow 424, and provide the raw results of the query to the results formatter 466 of the query processing engine 481 as indicated by arrow 427. The raw results may be reformatted and provided to the client-side component 493, as indicated by arrow 455. In some cases the formatting may involve transforming one or more attribute values or data items from binary to non-binary encodings.

If executable code corresponding to query 470 is not found in cache 487, the code generator 484 may be invoked, as indicated by arrow 423. The code generator may produce a new executable code module 440 for query 470, and place it in cache 485 as indicated by arrow 434. In some embodiments, at least some executable query code modules may be replicated at other QANs, as indicated by arrow 432. In one embodiment, for example, the query processing engine 481 may by default replicate query execution code modules as soon as they are generated. In another embodiment, query code may only be replicated for a subset of the queries, and/or may be replicated on demand (e.g., after a cache miss within another QAN's query code cache). In some embodiments, at least some QANs of a fleet may not comprise code generators—e.g., a subset of the nodes (such as one or more master nodes or one or more designated code generating nodes) may be responsible for producing executable code modules and propagating them to nodes where they are needed.

Examples of Optimized Operations

Figure 5:
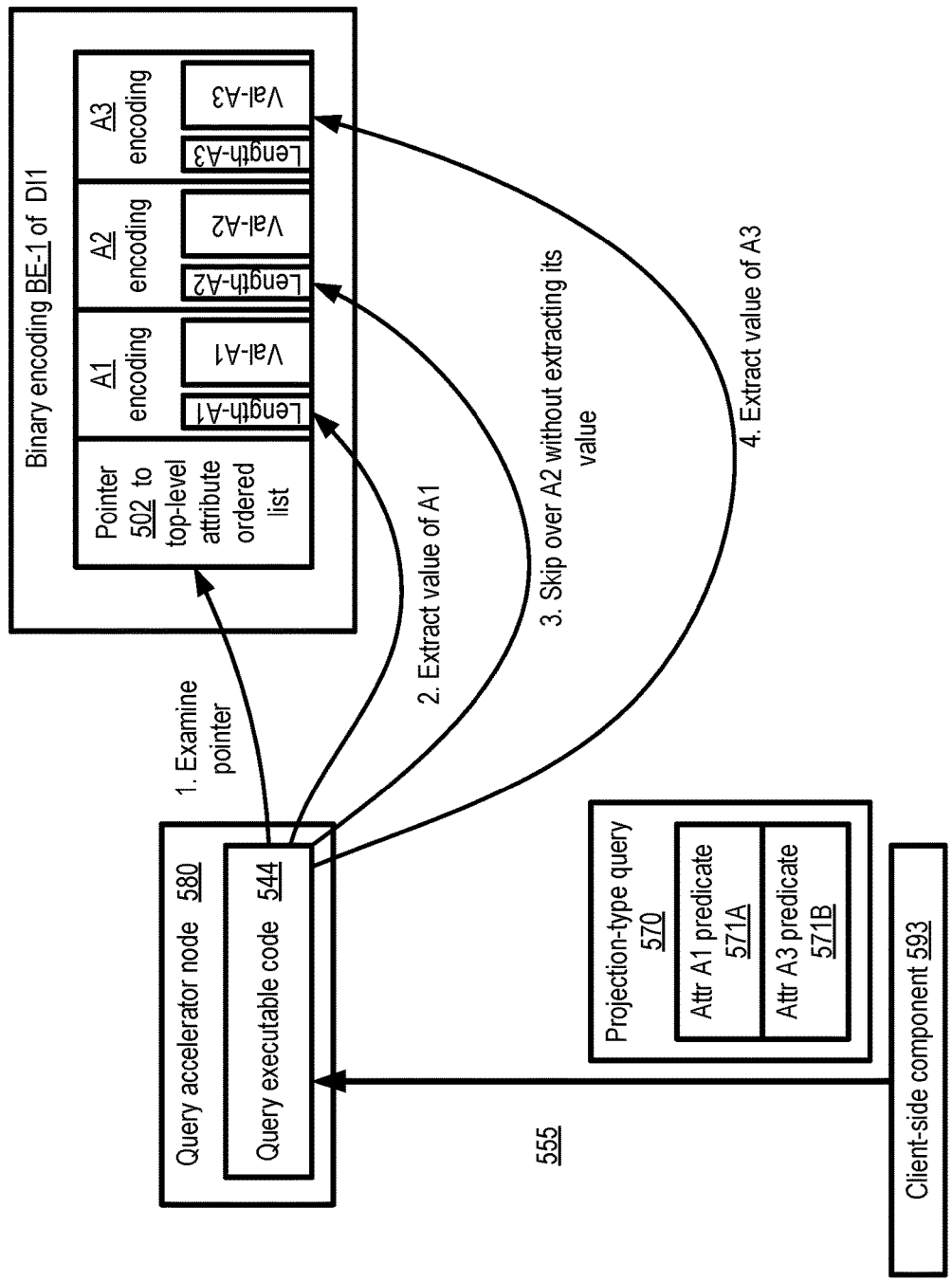
FIG. 5 illustrates an example of optimized processing of a projection query using binary encodings of data items, according to at least some embodiments.

As mentioned earlier, the processing of a number of different types of client requests may be speeded up using cached binary encodings of data items and cached query execution code modules in various embodiments. FIG. 5 illustrates an example of optimized processing of a projection query using binary encodings of data items, according to at least some embodiments. As shown, a projection query 570 may be submitted by client-side component 593 to a query accelerator node 580. The projection query 570 comprise predicates 571A and 571B, which refer to attributes A1 and A3 but do not refer to attribute A2 of the targeted data item collection. In some storage systems, a complete object graph may be constructed for each data item targeted by query 570, with all the attribute values being extracted from the data item. In contrast, in the embodiment depicted in FIG. 5, only those attributes whose values have to be processed to respond to the query are extracted, and the remaining attributes may not be materialized.

When processing the binary encoding BE-1 of a given data item DI1, the executable code 544 for query 570 may first examine the pointer 502 to the top-level attribute list (e.g., to confirm that DI1 is one of the items targeted by query 570, and/or to determine the order in which the attribute values are stored), as indicated by the arrow labeled "1". Then, the values of the specific attributes A1 and A3 which are to be projected from the data items may be examined, as indicated by the arrows labeled "2" and "4". Other attributes, such as A2 may simply be skipped (i.e., without extracting their values), as indicated by the arrow labeled "3" in FIG. 5. The length fields (such as Length-A1, Length-A2 etc.) may be used to determine how many bytes each attribute's binary encoding occupies in the depicted embodiment. Depending on the fraction of attributes which can be skipped, considerable savings may be achieved with respect to the processing required for projection-type queries in at least some embodiments. Many data item collections may comprise hundreds of attributes arranged in a complex hierarchy, so extracting the values and constructing the hierarchy of objects for the different attributes may require a substantial amount of processor and/or memory resources. At least some of this kind of processing may be avoided using optimizations of the kind shown in FIG. 5.

Figure 6:
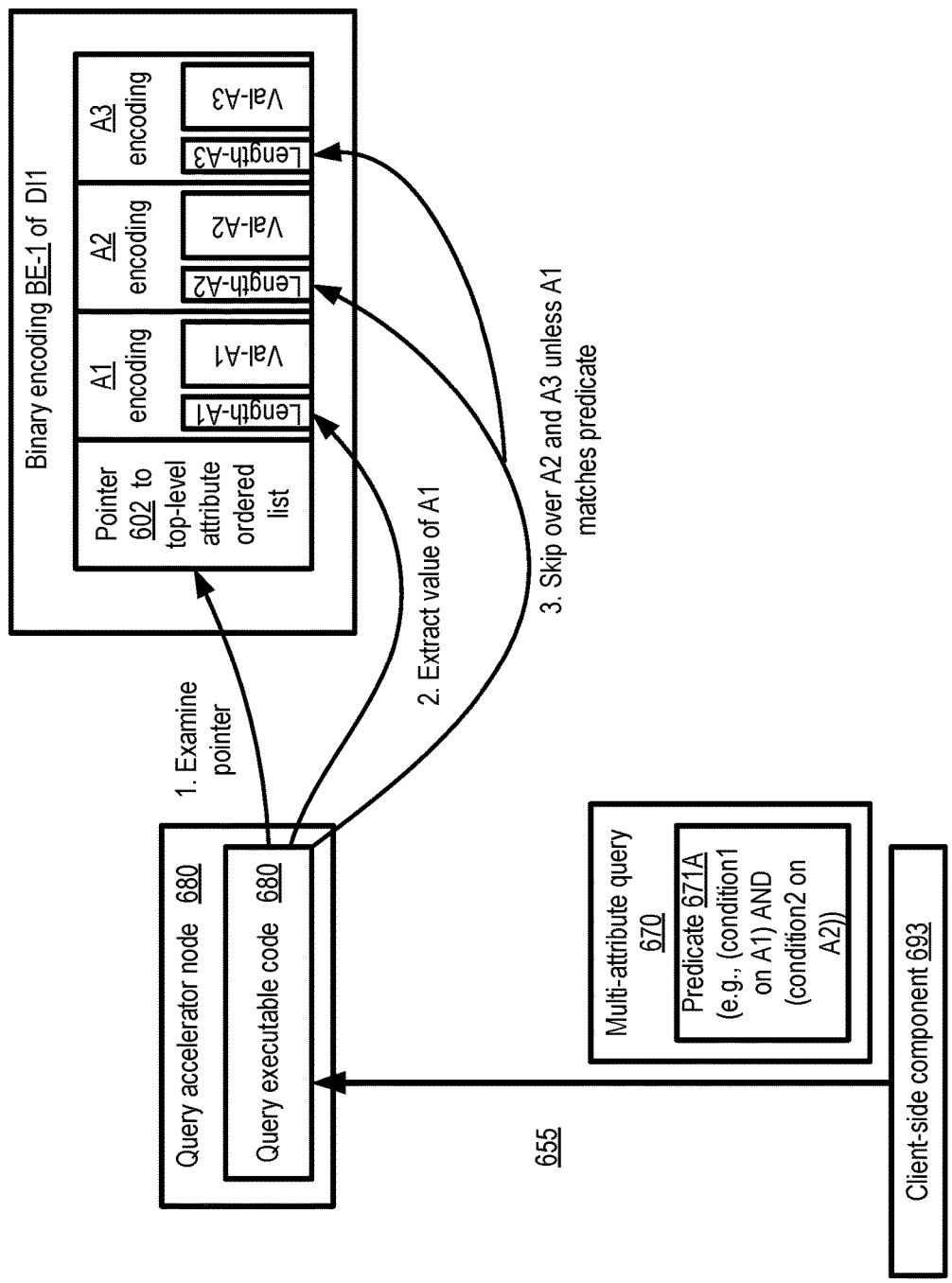
FIG. 6 illustrates an example of optimized processing of a multi-attribute query using binary encodings of data items, according to at least some embodiments.

Similar benefits may be achieved for multi-attribute queries whose predicates are connected using Boolean ANDS. FIG. 6 illustrates an example of optimized processing of a multi-attribute query using binary encodings of data items, according to at least some embodiments. In the depicted example, a query 670 with a predicate which includes a condition on attribute A1 and a condition of attribute A2 is submitted by a client-side component to a QAN 680, as indicated by arrow 655. If the condition for attribute A1 is not met, there may be no need to examine the value of attribute A2. Once again, instead of instantiating all the attribute values of a given data item DI1's binary encoding BE-1, the code generated for the query 670 may begin by examining the pointer to the top-level attribute list 602 (arrow "1"). Next, the value of the first attribute for which a condition is included in the predicate (attribute A1 in this example) may be extracted and examined, as indicated by the arrow labeled "2". The values of the remaining attributes may not be extracted if the value of A1 does not meet predicate 571's condition, as indicated by the arrow labeled "3". As a result of such short cuts, considerable processing may be avoided for at least some types of queries in various embodiments.

Figure 7:
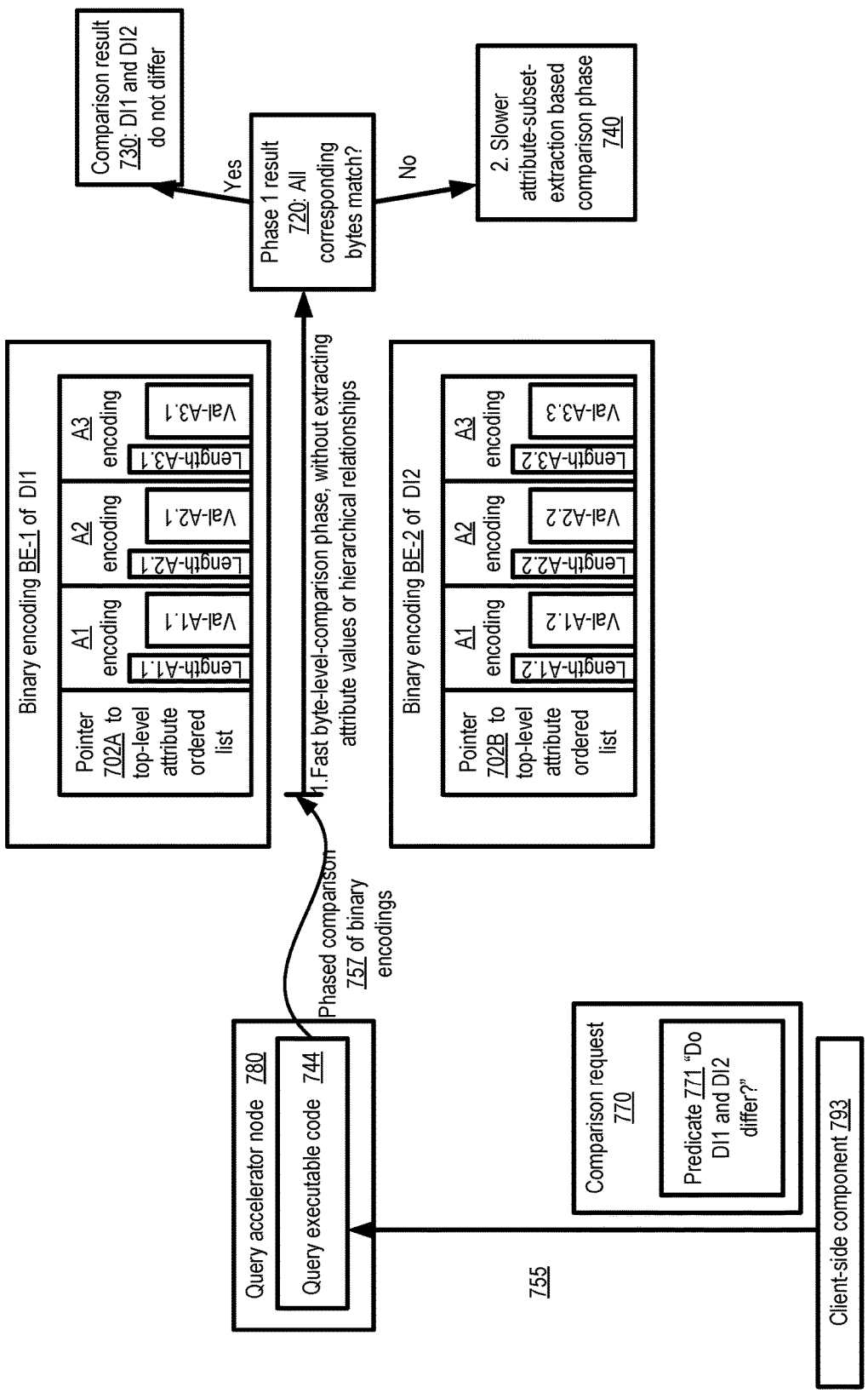
FIG. 7 illustrates an example of optimized processing of data item comparisons using binary encodings, according to at least some embodiments.

FIG. 7 illustrates an example of optimized processing of data item comparisons using binary encodings, according to at least some embodiments. In the depicted embodiment, an implicit or explicit comparison request 770 may be sent by a client-side component to a query accelerator node 780, as indicated by arrow 755. The request may be implicit in that a response to the actual client-submitted request may depend on comparing data items such as DI1 and DI2: for example, a query which involves sorting data items (e.g., an "order by" query) may be submitted, and the sort may require data item comparisons.

The executable code 744 generated in response to query 770 may initiate a phased comparison 757 of the respective binary encodings BE-1 (of data item DI1) and BE-2 (of data item DI2) in the QAN's data cache. In a first faster phase (indicated by the arrow labeled "1"), which may be termed a byte-level comparison phase, corresponding bytes of the two encodings may be compared in order—e.g., byte 1 of BE-1 may be compared to byte 1 of BE-2, byte 2 of BE-1 may be compared to byte 2 of BE-2, and so on. This byte-level comparison may not require any of the attribute values (e.g., values A1.1, A1.2, A2.1, A2.2 etc.) to be materialized or extracted from the binary encodings in the depicted embodiment. The length fields for the attributes, such as lengthA1.1, lengthA1.2 etc. may also not be converted to numeric variables in the fast byte-level comparison phase.

If all the corresponding bytes of both encodings match (as determined in result check 720), then the two data items may be considered identical, as indicated in comparison result 730. As soon as a non-matching byte is encountered, the byte-level comparison phase may be terminated (as indicated in block 740), and a second phase of the comparison may be initiated. In the second phase, at least a subset of the attribute values and lengths may be extracted from the respective binary encodings BE-1 and BE-2, and the values of the attributes may be compared. This second phase may in general be somewhat slower than the first byte-level comparison phase. However, depending on the byte offset at which the mismatch between the binary encodings is identified, it may often be the case that a significant fraction of the attribute values may not need to be extracted from either data item. For example, if the two data items had 100 top-level attributes and no lower-level attributes, and the first mismatch was identified at an offset corresponding to attribute 90, values of no more than 10% of the attributes may have to be extracted in the depicted embodiment. As a result, the total time taken to compare (or sort) large numbers of data items may be reduced considerably in at least some cases.

Figure 8:
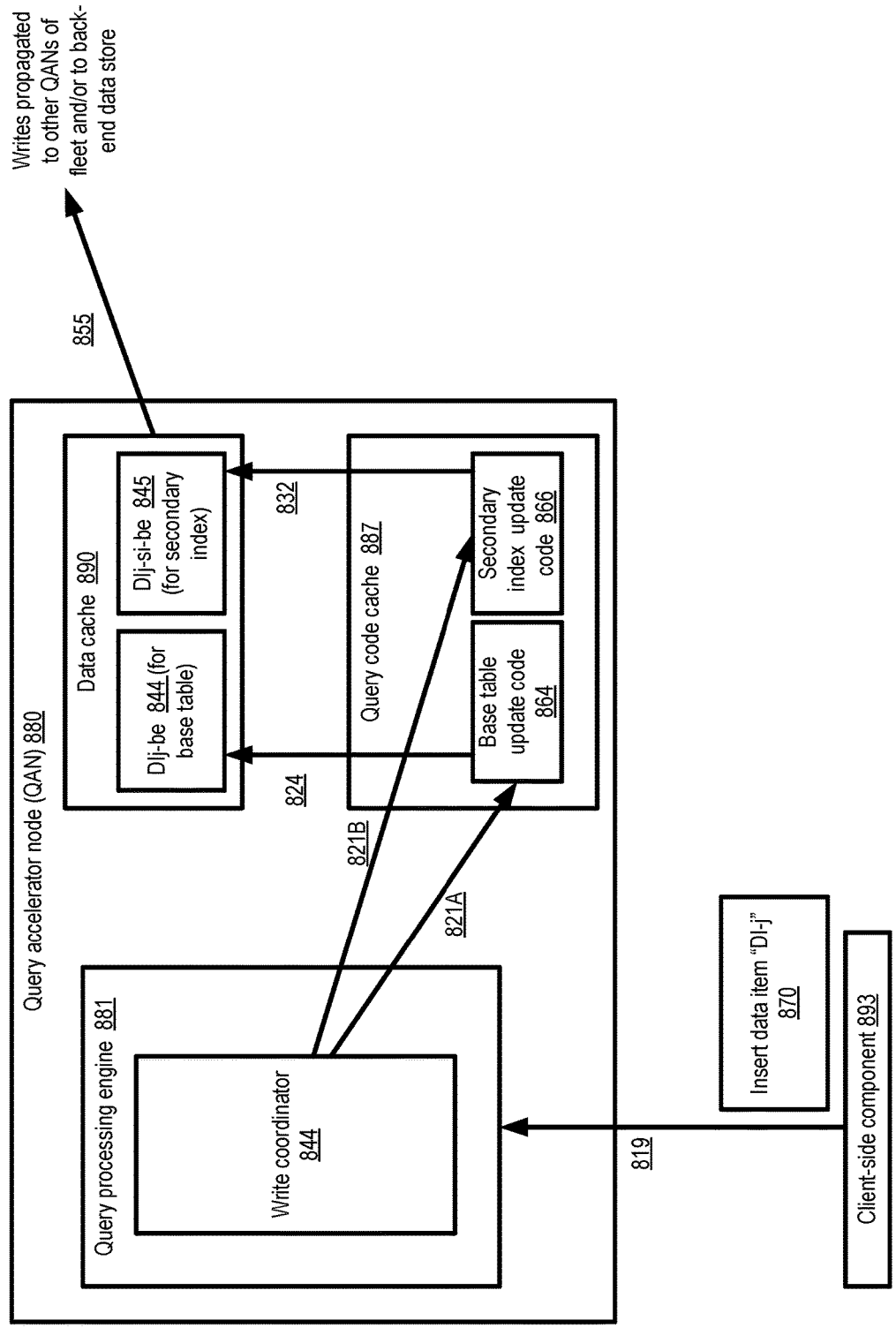
FIG. 8 illustrates an example technique for updating secondary indexes which may be employed at a query accelerator node, according to at least some embodiments.

Some data stores may implement several different types of indexes on data items. For example, primary indexes may be constructed by default on a specified key or key set of a table or similar collection of data items at a non-relational database system, while secondary indexes with different key attributes may be constructed on demand. In at least some embodiments, so-called base tables may contain the original data items (e.g., records) which have primary indexes built for them, and a secondary index may be implemented by constructing special tables whose records include the secondary index key and a pointer to (or a copy of) some subset or all of the other attributes of the data items. For example, consider a scenario in which Attr1 is a primary key attribute of a base table T1, and individual data items or rows of T1 also include attributes Attr2, Attr3 and Attr4. A customer may request the creation of a secondary index with key Attr2, with the additional request that the value of Attr3 (but not Attr4) should be materialized in the secondary index. To update such an index when a new record is inserted into T1, a corresponding record may be inserted into a table serving as the secondary index. FIG. 8 illustrates an example technique for updating secondary indexes which may be employed at a query accelerator node, according to at least some embodiments.

In the embodiment depicted in FIG. 8, a client-side component submits a request 870 to insert a data item DI-j into a base table which has an associated secondary index, as indicated by arrow 819. A write coordinator component 844 of the query processing engine 881 of the query accelerator node to which the request is submitted may invoke two separate pieces of executable code in query code cache 887 to respond to the insert request 870 in the depicted embodiment, as indicated by arrows 821A and 821B. Base table update code 864 may be invoked to add the new record to the base table, and a corresponding binary encoding DIj-be may be stored in the query accelerator node's data cache, as indicated by arrow 824. A different executable code module 866, generated by the QAN's code generator for the secondary index, may also be invoked, which results in the creation of a binary encoding of a secondary index entry DIj-se-be corresponding to the newly-inserted record. Similar executable code modules may also be generated and used for primary indexes in some embodiments, and/or for other data artifacts which may have to be modified as a side-effect of a data item write or insert.

Query Accelerator Policies

Figure 9:
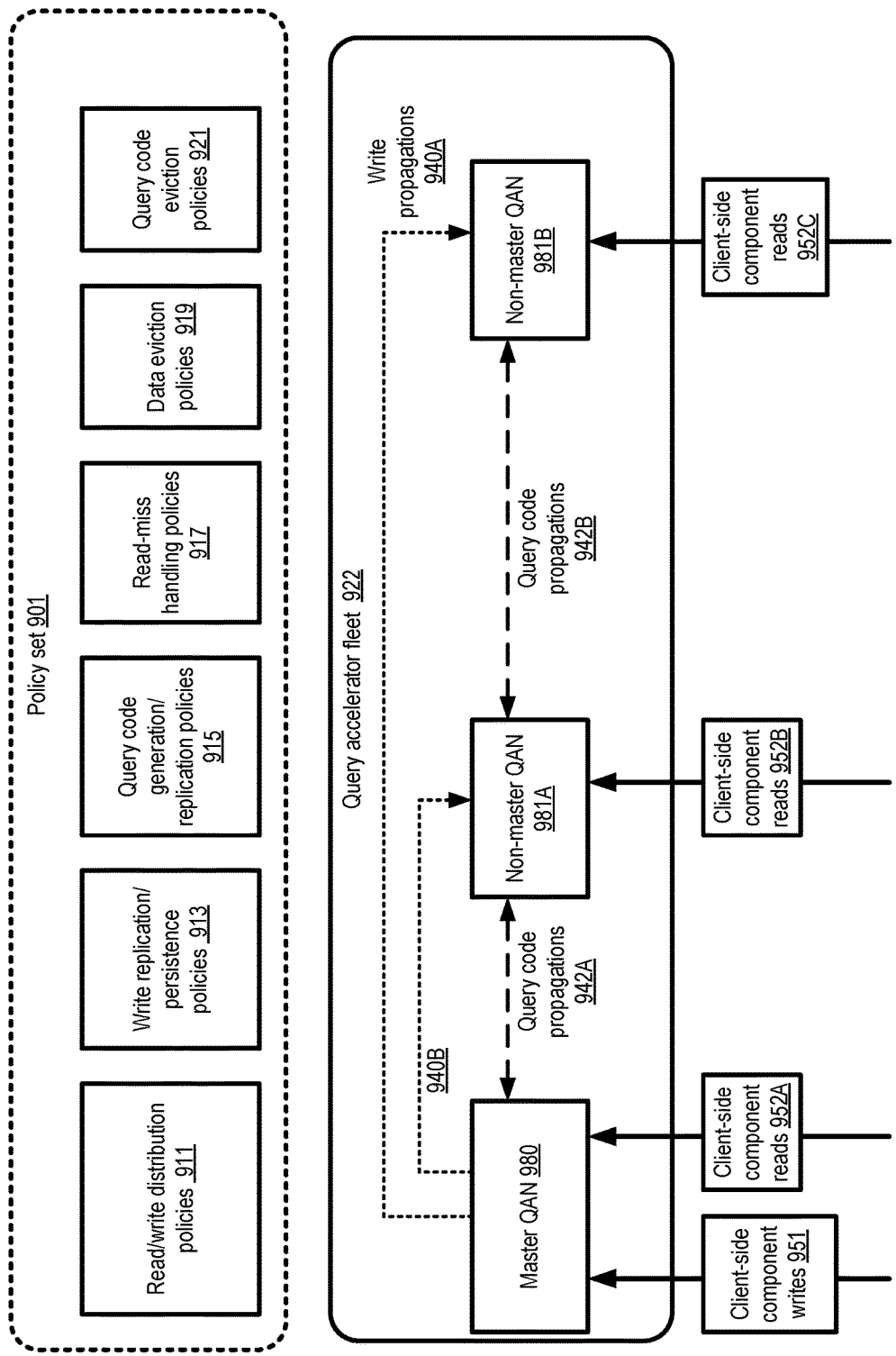
FIG. 9 illustrates examples of policies governing the handling of operations at query accelerator nodes, according to at least some embodiments.

FIG. 9 illustrates examples of policies governing the handling of operations at query accelerator nodes, according to at least some embodiments. Policy set 901 includes six types of policies in the depicted embodiment: read/write distribution policies 911, write replication/persistence policies 913, query code generation/replication policies 915, read miss handling policies 917, data eviction policies 919, and query code eviction policies 921.

The read-write distribution policies 911 may indicate the rules which decide which subset of the QANs of a QAF are responsible for handling write requests, and which subset are responsible for reads. For example, in QAF 922, one of the QANs (980) is designated at a given point in time as a master QAN responsible for handling both reads and writes, while other QANs such as 981A and 981B are designated as non-master nodes responsible only for reads. The role of a given QAN may be changed (from master to non-master, or vice versa) dynamically in some embodiments—e.g., in the event that a master QAN becomes unreachable, one of the non-master QANs may be elected as the new master using a quorum-based election in the depicted embodiment. According to the read/write distribution policy in effect at QAF 922, the result of a client-side component's write 951 may be cached at the master QAN 980, and propagated from the master QAN to non-master QANs 981A and 981B automatically (as indicated by arrows labeled 940A and 940B). Any of the QANs may respond to read queries 952 (e.g., 952A, 952B or 952C). In at least one embodiment, any QAN may receive and process a write request, so the roles of master and non-master nodes may not be used. In at least some embodiments, a master or non-master role may be assigned at the granularity of data items—for example, one QAN may be assigned the master role (i.e., the responsibilities of handling/replicating writes) with respect to one set of data items at a given point in time, while another QAN may be assigned the master role with respect to another set of data items. In one embodiment, instead of implementing full replication of data items at multiple nodes, a more space-efficient replication approach such as erasure coding may be implemented for at least some data items at some of the nodes.

Write replication and persistence policies 913 may govern the manner in which writes are (a) to be replicated among the QANs and (b) propagated from QANs to back-end data stores. According to one write replication policy, a QAN which receives a write request may be required to propagate the write to one or more other QANs before a response indicating that the write has succeeded can be provided to the requester. According to a different write replication policy, multi-QAN replication may not be required before an indication of a write's success is provided to the requesting client-side component. With respect to transmitting writes to the back-end data stores, write-through and/or write-back persistence policies may be supported in some embodiments. In the write-through mode, when a write request is received at a QAN, that write may be applied synchronously at the back-end data store (e.g., before a response is provided to the requester). In the write-back mode, the write may be inserted in the local data cache at the receiving QAN (and potentially replicated at other QANs) before the response is provided to the requester, but the back-end write may be performed asynchronously. Additional details regarding the manner in which write-back operations are coordinated are provided below. The write replication and persistence policies may differ for different data item collections in some embodiments—for example, one policy for replication and persistence may be applied to one table, while a different policy may be applied for another table.

Query code generation/replication policies 915 may be used to control which QANs generate executable code for queries, whether such code is generated for all types of queries or a subset of queries, and whether the code is replicated at multiple QANs after it is generated. In the depicted embodiment, the particular QAN 980 which generates code for a query may replicate the code among all the other QANs 980 in accordance with the policy 915 for fleet 922, as indicated by the arrow labeled 942A and 942B. Some policies may require all QANs to generate and cache code locally, but may not require replication of the code; other policies may require only a subset of QANs to generate code and transmit replicas of the code to other nodes. Whether a given executable code module is replicated or not may depend on the workload and/or network conditions in some policies—e.g., code may be replicated as long as the amount of available bandwidth to other QANs is above a threshold, and/or as long as the average CPU utilizations at the sending QAN is below a threshold. In some embodiments, the query processing engines of the QANs may be able to distinguish between queries which are likely to be re-issued frequently, and queries which are probably going to be issued rarely. In such a scenario, code may be generated and/or replicated only for the more frequent queries.

Read miss handling policies 917 may comprise rules indicating the sources from which data items are to be loaded into a QAN's local data cache in the event that a read request results in a cache miss—e.g., whether the data should be read from the back-end data store layer or from a QAN. Data eviction policies 919 may comprise rules indicative of the degree of independence with which different QANs of a given QAF may make decisions regarding removal of data items from their local data caches, the set of factors or criteria to be considered when choosing eviction victims at the local data caches, whether eviction-related notifications regarding data items are to be transmitted from one QAN to another, and so on. Similarly, query code eviction policies 921 may comprise rules indicative of the degree of independence with which different QANs of a given QAF may make decisions regarding removal of query code modules from their local query code caches, the set of factors or criteria to be considered when choosing query code eviction victims, whether eviction-related notifications regarding query code modules are to be transmitted from one QAN to another, and so on. In some embodiments customers of the query acceleration service may indicate preferences regarding the specific set of policies 901 to be employed in their QAFs, e.g., either at a global level or at the level of specific data item collections such as tables. In other embodiments, the query acceleration service may select the policies to be enforced, e.g., based on various factors such as the number of QANs set up, the expected mix of reads and writes, the nature of the application for which the QAF is established, etc.

Non-Uniform Accelerator Nodes and Workloads

Figure 10:
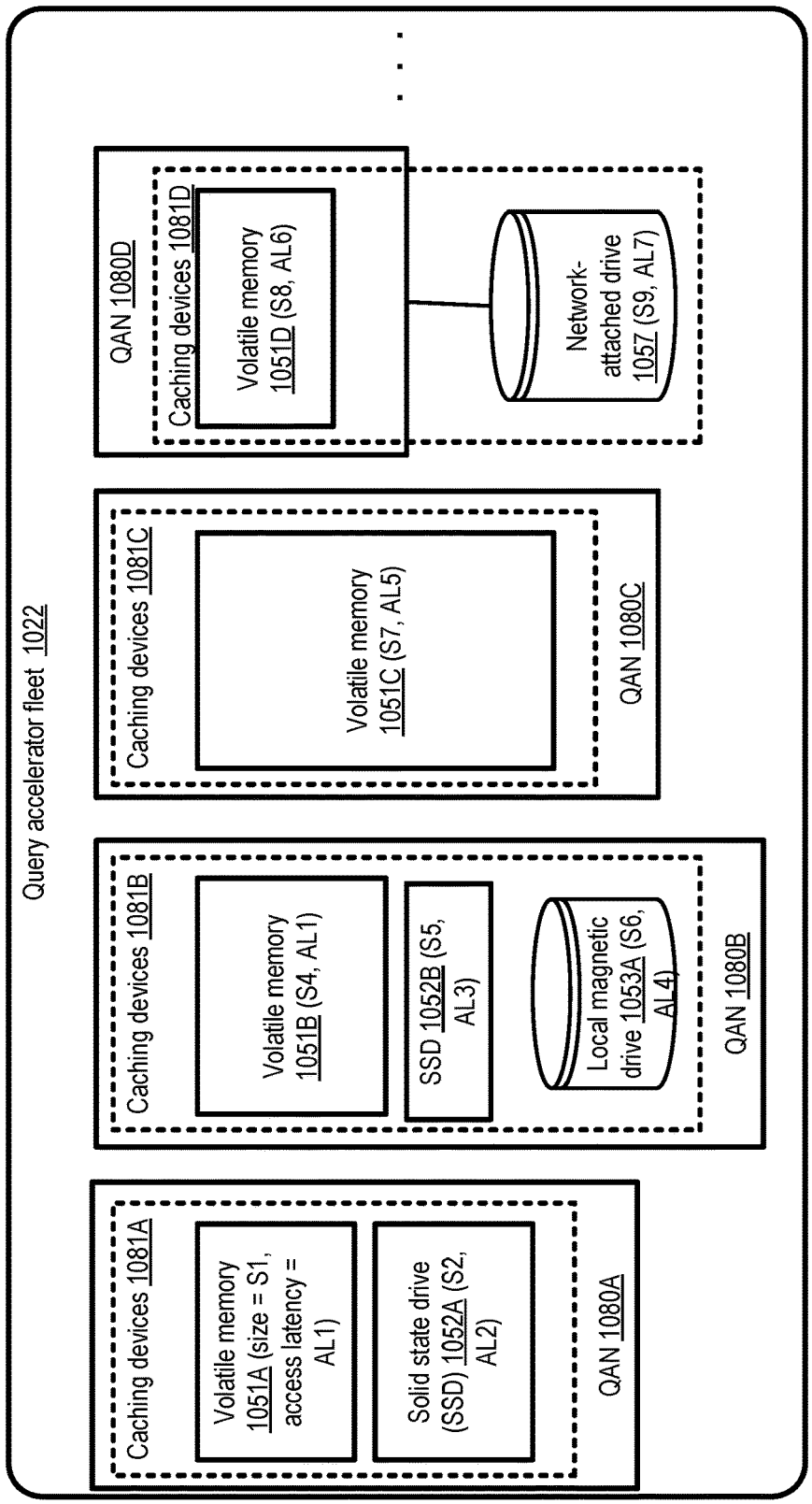
FIG. 10 illustrates examples of differences in capabilities and device types among query accelerator nodes of a given fleet, according to at least some embodiments.

As mentioned earlier, he QANs of a given QAF may differ from one another in various aspects. FIG. 10 illustrates examples of differences in capabilities and device types among query accelerator nodes of a given fleet, according to at least some embodiments. Query accelerator fleet 1022 comprises four QANs 1080A-1080D. The local cache of QAN 1080A comprises portions of two caching devices 1081A: a volatile memory device 1051A and a solid state drive (SSD) 1052A. The volatile memory portion of the cache of QAN 1080A has a size S1 and an average access latency AL1 (e.g., a read response time for a data item of a selected size), while the SSD portion has a size S2 and an average access latency AL2.

QAN 1080B's caching devices 1081B comprise three types of devices: a volatile memory portion 1051B with size S4 and average latency AL1, an SSD portion 1052B with size S5 and average latency AL3, and a local magnetic drive 1053A with a size S6 and an average latency AL4. QAN 380C's caching devices 1081C comprise only a volatile memory 1052C with size S7 and access latency AL5. QAN 1080D's caching devices 1081D include a volatile memory portion 1051D with size S8 and access latency AL6, and a network-attached drive 1057 with a size S9 and an access latency AL7. In the non-uniform configuration illustrated in FIG. 10, the different QANs may use different combinations of a variety of storage or memory devices for their caches. In other embodiments, some subset (or all) of the QANs may have identical cache configurations.

Figure 11:
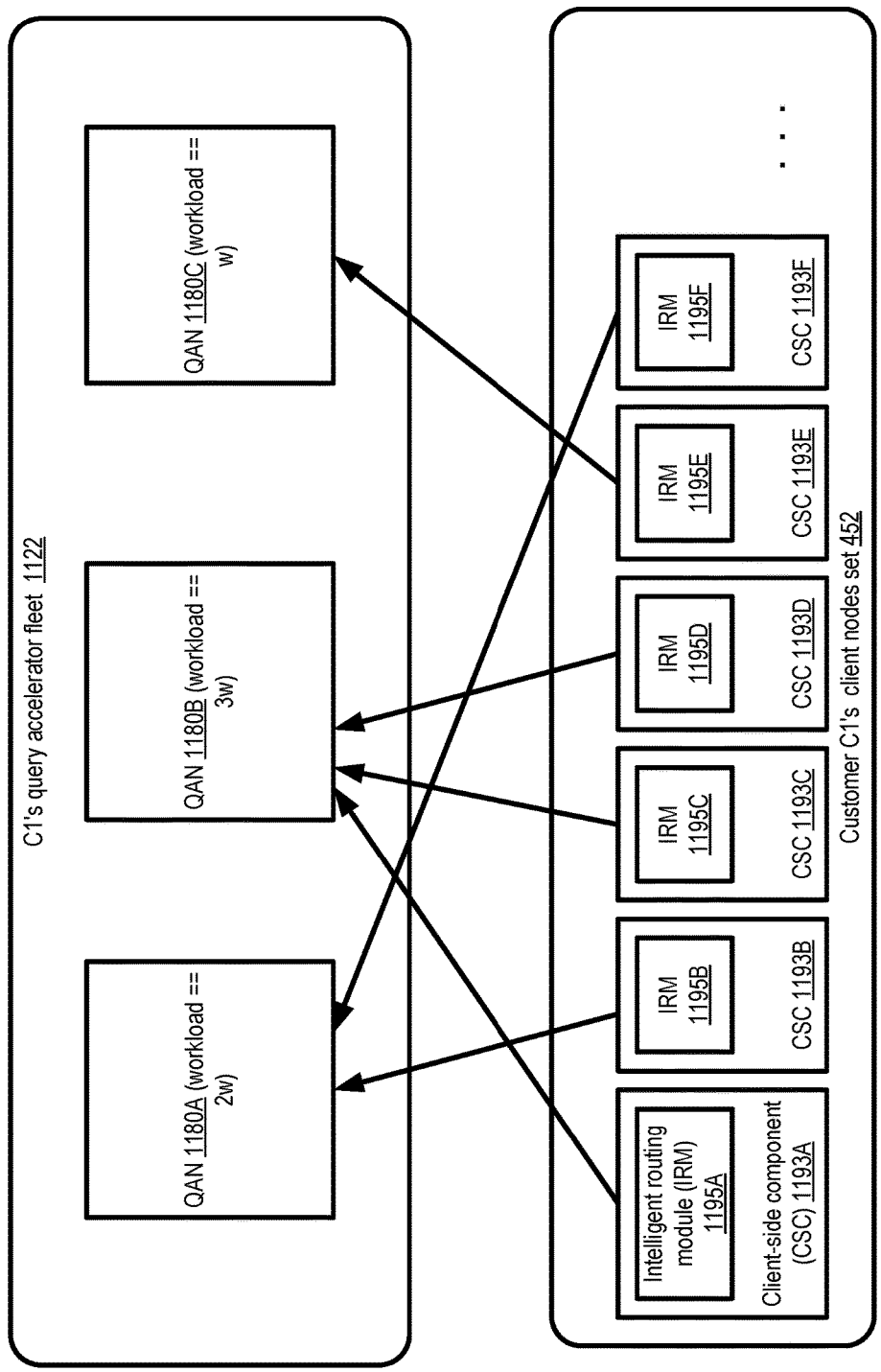
FIG. 11 illustrates an example of intelligent client-side routing of I/O (input/output) requests, resulting in a potentially non-uniform workload distribution among query accelerator nodes of a fleet, according to at least some embodiments.

The QANs of a given QAF may differ not only in their capabilities in some embodiments, as shown in FIG. 10, but also in their workloads. FIG. 11 illustrates an example of intelligent client-side routing of I/O (input/output) requests, resulting in a potentially non-uniform workload distribution among query accelerator nodes of a fleet, according to at least some embodiments. Customer C1's query accelerator fleet 1122 comprises three QANs 1180A-1180C in the depicted embodiment. Each of the several client-side components 1193 (e.g., 1193A-1193F) of C1's application includes a respective intelligent routing module (IRM) 1195 (e.g., IRMs 1195A-1195F respectively of client-side components 1193A-1193F). The IRMs may, for example, be provided metadata regarding the differences between the QANs 1180 and/or the rules to be followed when selecting a destination for a given query. Such metadata may include rules indicating that certain types of queries should be directed only to master QANs, for example, or to specific QANs which are known to generate and cache code for those types of queries. In some embodiments, the workload directed to any given QAN may depend on the subset or partition of the application's data set to which a query is directed. For example, an application's data set may comprise K tables, with one QAN being designated to handle a respective subset of the tables. Alternatively, in some implementations a hash function (whose input may include components of a query's predicates such as table identifiers, object identifiers or record identifiers) may be used to select the particular QAN to which a query should preferably be directed.

In some embodiments in which data items are replicated among the QANs, but different QANs have caches of different sizes or use different eviction policies, it may be possible for an IRM to calculate or estimate a probability of finding a given set of data items in the local data cache of a particular QAN, and/or the probability of finding code for a particular type of query in the local query code cache of the particular QAN. Such probabilities may be computed for some subset or all of the QANs by an IRM 1195, and a particular QAN whose probability or probabilities exceeds a threshold may be selected as a target for a given query being prepared at a client-side component 1193. In the depicted example scenario, the workload of QAN 1180B (e.g., over a particular time interval) is 3w, three times the workload w of QAN 1180C and one and a half times the workload 2w of QAN 1180A. In such a heterogeneous workload scenario, the approach of evicting data items independently from the various QAN caches may be especially useful. In some embodiments, an IRM 1195 may transmit requests directly to the back-end data store instead of routing it via the QANs. This approach may be taken, for example, if the probability of re-accessing a particular data item targeted in the request is estimated to be low (and hence the benefit of caching that data item at the QANs is also estimated to be low).

Heterogeneous Data Stores

Figure 12:
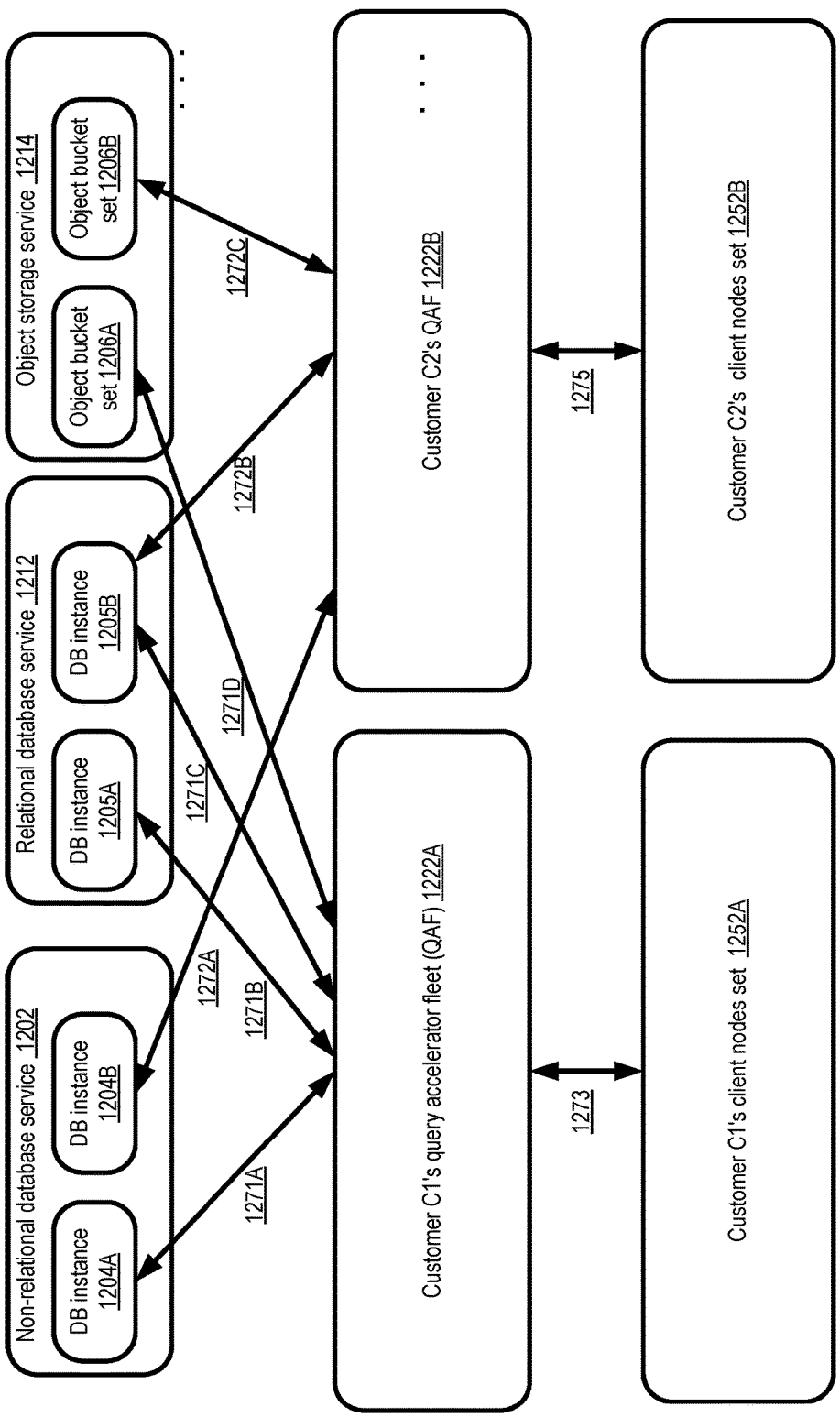
FIG. 12 illustrates examples of the use of query accelerator fleets for heterogeneous collections of back-end data stores, according to at least some embodiments.

FIG. 12 illustrates examples of the use of query accelerator fleets for heterogeneous collections of back-end data stores, according to at least some embodiments. In the depicted embodiment, the applications of customer's C1 and C2 access data stored in three different storage services of a provider network: a non-relational database service 1202, a relational database service 1212, and an object storage service 1214. Within each of the database services 1202 and 1212, multiple database instances may be set up on behalf of various customers: for example, relational database instances 1204A and 1204B may be established using the resources of service 1202, while non-relational database instances 1205A and 1205B may be set up using the resources of service 1212. Similarly, object bucket sets 1206A and 1206B may be established using the resources of object storage service 1214. A given object bucket may comprise an unstructured data item of an arbitrary size, with web services interfaces used to access the object. Each storage service 1202, 1212 and 1214 may implement its own sets of programmatic interfaces—e.g., an SQL-based language may be used to access data at the relational database instances, a key-value based query language may be used at the non-relational database instances, and an HTTP URL (HyperText Transfer Protocol Universal Record Locator) based interface may be used to access the object buckets of service 1214.

Query accelerator fleet 1222A may be established in behalf of customer C1 in the depicted scenario, acting as an intermediary between C1's client node set 1252A and the storage services. Similarly, query accelerator fleet 1222B may be established on behalf of customer C2, acting as an intermediary between C2'c client node set 1252B and the storage services. Client-side components of the customers' applications may submit I/O requests to QANs within their respective QAFs 1222, and receive corresponding responses, as indicated by arrows 1273 and 1275. A given read query from a client-side component may potentially be translated at a QAN into more than one request to a respective database instance or object bucket set in the depicted embodiment. For example, one request from client node set 1252B may result in a first request 1271A to non-relational database instance 1204A, a second request 1271B to relational database instance 1205A, a third request 1271C to a second relational database instance 1205B, and a fourth request to object bucket set 1206A. Similarly, a particular request from client node set 1252B may result in a first request 1272A to non-relational database instance 1204B, a second request 1272B to relational database instance 1205B, and a third request 1272C to object bucket set 1206B. The requests to the back-end data stores may be formatted in the appropriate query language at the QANs, e.g., by the query processing engine; that is, a QAN may be able to retrieve (and write) data items using several different languages and data models. Results from several back-end data stores may be stored in a common cache at a QAN in some embodiments. In at least one embodiment, separate caches or separate cache partitions may be used for the different back-end data stores. In general, a given QAN may communicate with any number of back-end data store instances, implementing any combination of data models (e.g., a relational data model, a non-relational data model, or an object data model) on behalf of customers in the depicted embodiment. In some embodiments, a read query submitted by a client-side component may be formatted in an accelerator-layer query language, and the query may be transformed into the appropriate back-end layer query language or API at the QAN. Transformations between non-binary encodings (which may be used for data items at the back-end storage services) and binary-encodings (which may be used at the QAF layer) may be performed as required. In at least one embodiment, client-side components may also be permitted to create and manipulate data items that reside only at the query acceleration service—that is, a given data item may not necessarily be written to a back-end data store.

Figure 13:
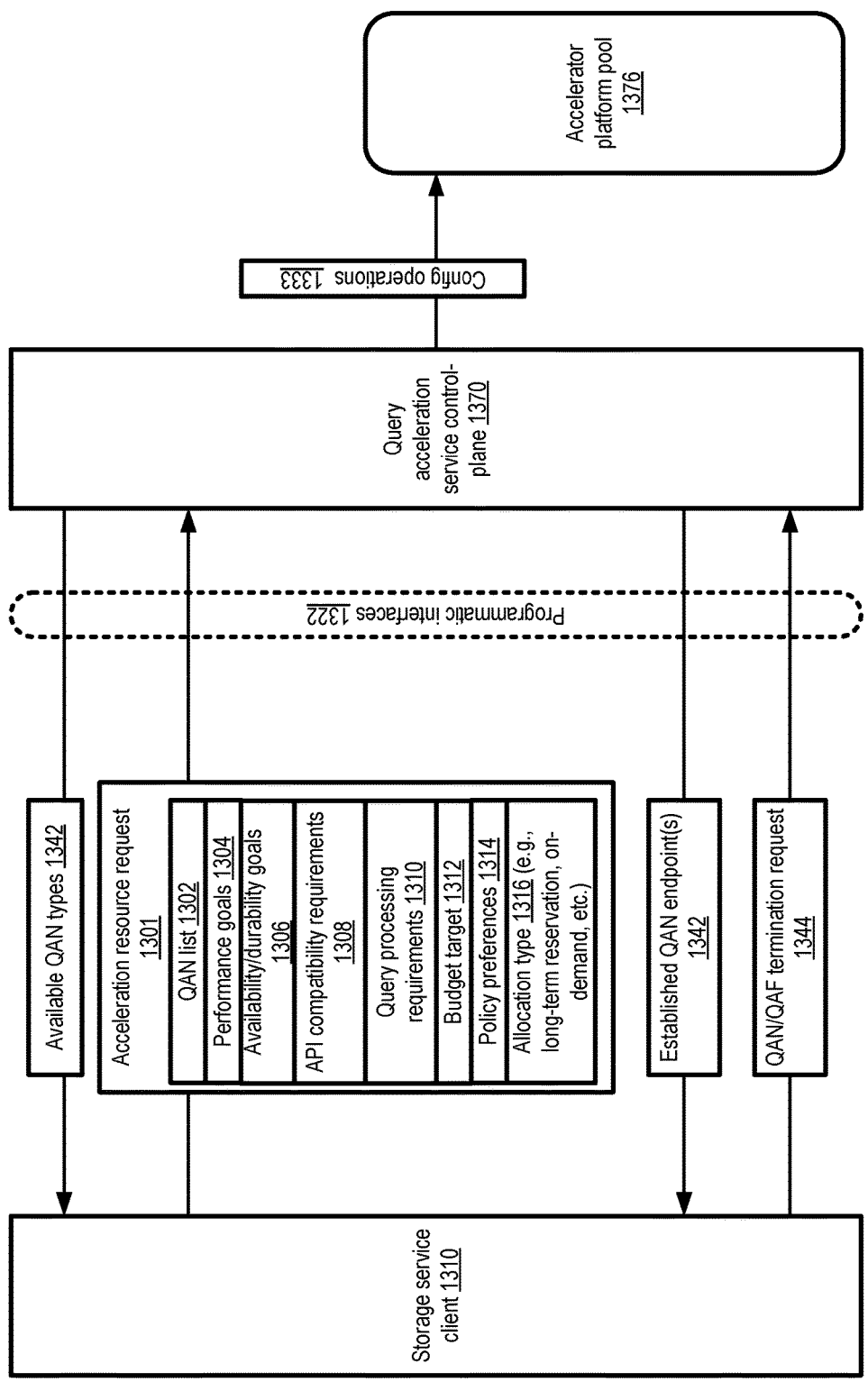
FIG. 13 illustrates example interactions between a data store client and the control-plane of a query acceleration service, according to at least some embodiments.

In some embodiments, the back-end data stores associated with a QAF 1222 may include one or more file systems (including for example distributed file systems similar to the Hadoop Distributed File System and/or single-node file systems). As mentioned earlier, in various embodiments a QAF may be set up as an intermediary between an external data store (located outside the provider network, e.g., at a customer's data center, customer office premises, or third-party premises) and client-side components issuing read and write requests. In one such embodiment, the back-end may include one or more data stores within the provider network and one or more data stores outside the provider network Fleet Configuration-Related Interactions FIG. 13 illustrates example interactions between a data store client and the control-plane of a query acceleration service, according to at least some embodiments. A control-plane component 1370 of the query acceleration service may implement a set of programmatic interfaces 1322 enabling storage service clients 1310 to submit QAF requests and receive QAF-related information in the depicted embodiment. In some embodiments, a number of different QAN types, which may for example differ from one another in performance capabilities, cache size and/or query processing capabilities, may be supported at the query acceleration service. In one scenario, "large", "medium" and "small" QANs may be supported for example. An indication 1342 of available QAN types may be provided via programmatic interfaces 1322 to a client 1310 in the depicted embodiment.

The client 1310 may indicate requirements or preferences for a QAF using a variety of different parameters of an acceleration resource request 1301. In some cases, for example, a client may simply provide a list of desired QANs 1302, such as the logical equivalent of "Please establish four medium QANs for my back-end data store DS1". In at least one embodiment, a client may instead or in addition provide a set of performance goals 1304, such as a targeted latency and/or throughput for various types of I/O operations, and the control-plane component 1370 may use the performance goals to determine how many QANs of each supported type should be established. A client may indicate availability and/or data durability goals 1306 for the accelerator layer in some embodiments, which may be used at the control plane 1370 to select the appropriate types and numbers of QANs to attempt to meet the goals. For example, if the client wants the data cached at the accelerator to be stored at persistent storage devices to achieve a desired level of availability or durability, QANs with attached SSDs or rotating disks may be allocated.

In some embodiments, as discussed in the content of FIG. 12, a number of back-end data stores with distinct APIs or query languages may be used for the customer's data sets, and the customer may indicate the API compatibility requirements 1308 for their QANs (e.g., the set of languages or interfaces which the QAN is to use on behalf of the client I/O requests) in acceleration resource request 1301. In various embodiments, the query processing engines of some QANs may be able to recognize contained queries (e.g., queries whose results can be determined using data that has been cached earlier for other queries with different query parameters). If a client prefers to utilize QANs with such capabilities, corresponding query processing requirements 1310 may be included in request 1301 in the depicted embodiment. In some embodiments the query processing requirements 1310 may indicate whether code should be generated and/or cached locally for at least some types of queries.

Different pricing rules or policies may apply to different types of query accelerator nodes in some embodiments, while in other embodiments the pricing for a QAF may be based on the performance achieved or targeted rather than on QAN types. A budget target 1312 for the QAF may be indicated by the client in the request 1301. Some clients may include caching policy preferences 1314 in their request for acceleration resources—e.g., desired rules governing read/write distribution, query code generation, eviction, read miss processing and the like may be indicated. In one embodiment, QANs may be allocated in several different modes to customers—e.g., some QANs may be reserved for log time periods, others may be obtained and released on demand, etc., with different pricing associated with the different modes. The allocation type(s) 1316 that the client wishes to use for their QAF nodes may be indicated in the resource request 1301 in the depicted embodiment. In various embodiments, at least a subset of the types of request parameters shown in FIG. 13 may be omitted (or other parameters may be included)—for example, the client may simply provide a list of desired QANs and leave other decisions to the service.

Upon receiving acceleration resource request 1301, the control plane component 1370 may identify a set of QAN platforms for the client from accelerator platform pool 1376 in the depicted embodiment. In some cases different parameters specified by the client may contradict one another—for example a budget target may not be compatible with a performance goal or an availability goal. In such cases the control-plane component may prioritize the competing requirements, come up with a best-effort configuration which meets at least some of the requirements/preferences, and notify the client regarding the proposed solution. If the client approves the proposed configuration (or if the requirements do not contradict one another), the appropriate platforms may be selected for the client's QANs. Configuration operations 1333 may be performed to establish the QANs, and a set of endpoints 1342 (e.g., Internet Protocol addresses, URLs, aliases, etc.) corresponding to the established QANs may be provided to the client. At some later point in time, the client may programmatically terminate or shut down individual QANs or the entire QAF, e.g., using termination requests 1344 in the depicted embodiment.

Methods for Binary Encoding-Based Optimizations

Figure 14:
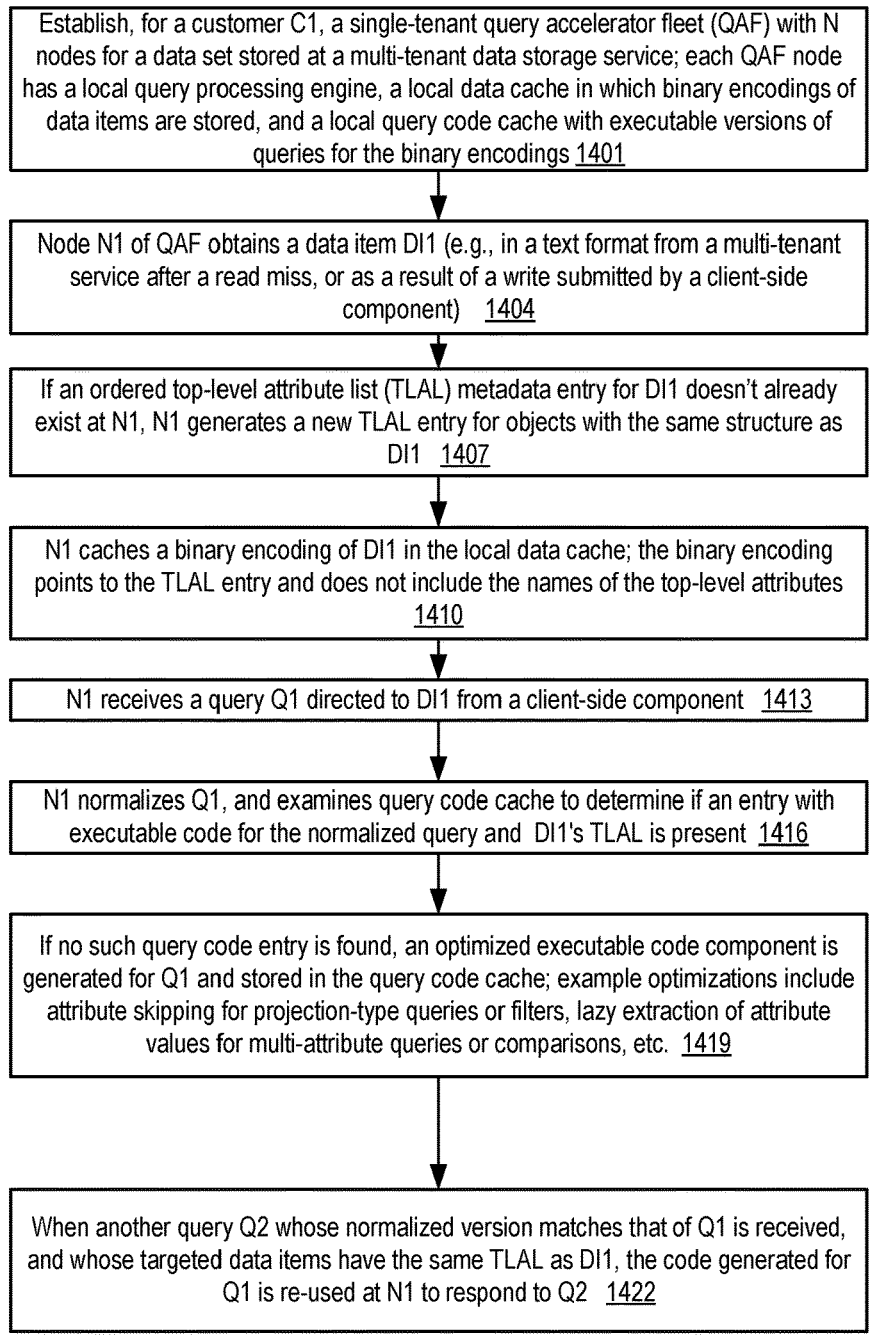
FIG. 14 is a flow diagram illustrating aspects of operations that may be performed at a query acceleration service at which binary encodings of data items are cached, according to at least some embodiments.

FIG. 14 is a flow diagram illustrating aspects of operations that may be performed at a query acceleration service at which binary encodings of data items are cached, according to at least some embodiments. As shown in element 1401, a single-tenant query accelerator fleet (QAF) comprises several query accelerator nodes (QANs) may be established on behalf of a customer C1 of a multi-tenant storage service. Each QAN may comprise a local data cache and a local query code cache, and the capabilities of different QANs may not be identical. For example, the sizes of the local caches and/or the types of devices (e.g., some combination of volatile memory, SSDs, rotating disks, etc.) used for the caches may differ at some nodes relative to other nodes.

A particular node N1 of the QAF may obtain a data item DI1 (element 1404), e.g., in a non-binary format such as a text format from the storage service in response to a read miss in the local data cache, or from a client in the form of a write request. The query processing engine at N1 may perform a lookup to determine whether a top-level attribute list (TLAL) metadata entry corresponding to DI1 (i.e., containing the names and relative positioning of the top-level attributes of DI1) is present in a local metadata entry set at N1. If such a TLAL entry is not found, a new one may be created (element 1407) for data items with the same set of attributes as DI1 arranged in the same order as in DI1. Regardless of whether a TLAL had to be created or not, a binary encoding of DI1 may be generated and stored in N1's local data cache in the depicted embodiment (element 1410). The binary encoding may include an identifier of (or some other pointer to) the TLAL for DI1, but may not include the names of the top-level attributes. Values of the top-level attributes, and names as well as values of lower-level attributes in the hierarchy of DI1's attributes may be included in binary form within the encoding. Any of a number of different formats or standards for binary encodings may be used in different embodiments for the data item encodings and/or the TLALs—e.g., CBOR, MessagePack, Binary Javascript Object Notation (B SON), or Universal Binary Javascript Object Notation (UBJSON) may be used.

A read query Q1 whose target data items include DI1 (and/or other data items with the same TLAL as DI1) may later be received at N1 from a client-side component of the storage service (element 1413). The query text may be normalized and converted to a standard or canonical form (e.g., in which the predicates are arranged in lexicographic order of the names of the attributes included in the predicates), and a lookup may be performed in N1's local query code cache to check whether an executable code module for the query is present (element 1416). In some embodiments, the lookup may utilize an index (or other similar query-code-related metadata collection) in which entries for executable code modules are searchable by a key which includes (a) the normalized query and (b) the identifier for the top-level attribute metadata entry of the set of data items to which the query applies. If such a matching query code module is found in the cache, it may be used to respond to the query. If no such module is found in the cache, a new executable code module may be produced by a code generator module at N1 (element 1419) and inserted in the query code cache. An index entry for the newly-cached query code module (which can be used during cache lookups performed for subsequent queries) may be generated and stored. The query code module may in some cases contain one or more optimizations or short cuts for speeding up queries (similar to those discussed above in the context of FIG. 5-FIG. 7) which utilize the binary encodings of data items. For example, depending in the type of query for which the code is generated, the entire attribute hierarchy of a data item may not be constructed, some attributes may be skipped or extracted lazily (only if required) from the binary encodings, and so on. The code may subsequently be re-used for other queries such as Q2 which are targeted to data items with the same top-level attributes arranged in the same order as the data items used to respond to Q1 (element 1422). In some cases the executable code may be replicated at other QANs of the fleet. The code may eventually be evicted from N1's local query code cache based on the eviction policies in place.

Alternative Modes for Writing Data to Back-End Data Stores

Figure 15:
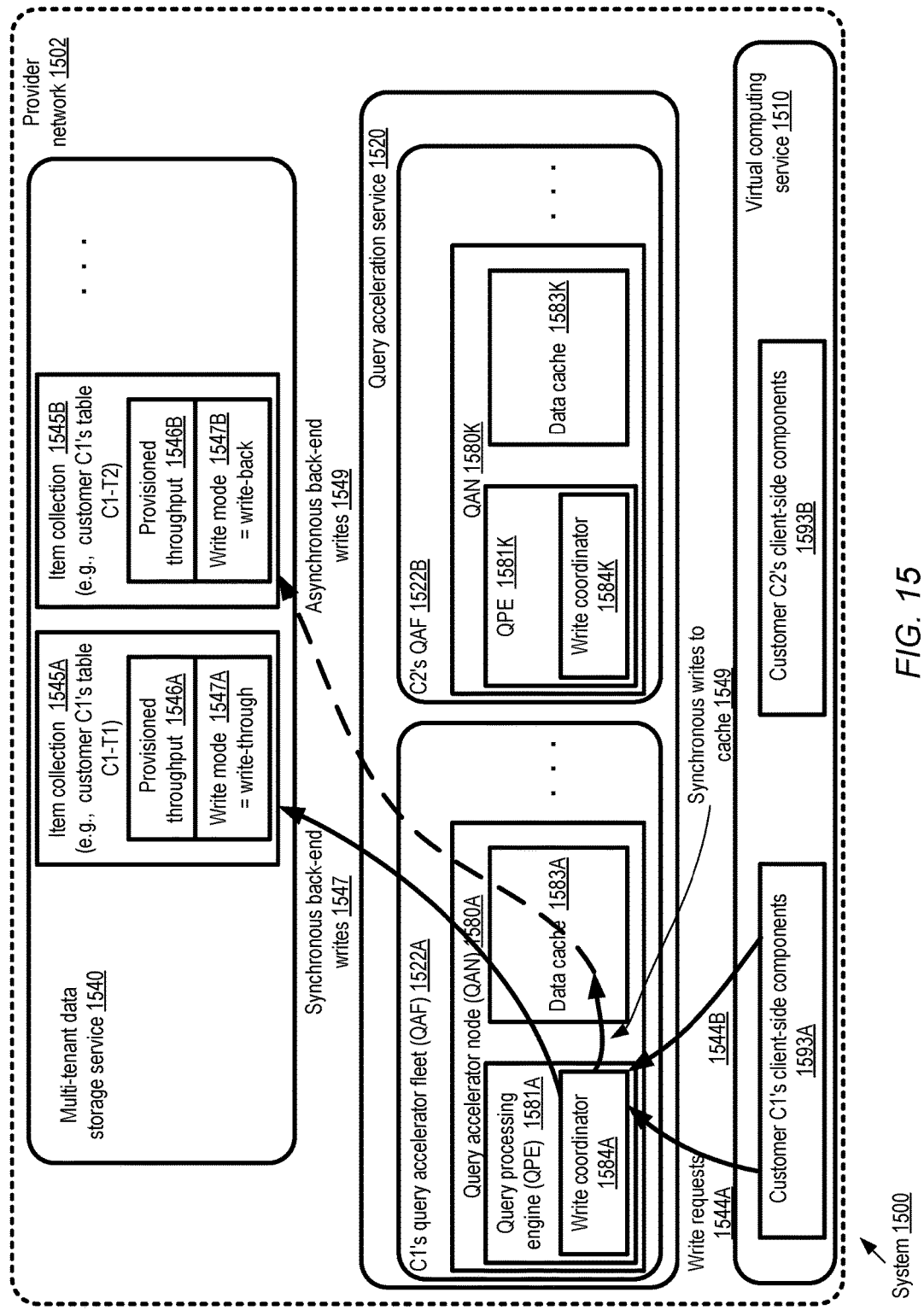
FIG. 15 illustrates an example system environment in which write-back and write-through modes of handling cached writes at query accelerator nodes may be implemented, according to at least some embodiments.

FIG. 15 illustrates an example system environment in which write-back and write-through modes of handling cached writes at query accelerator nodes may be implemented, according to at least some embodiments. The architecture illustrated in FIG. 15 shares several features with the architecture shown in FIG. 1. System 1500 also comprises respective sets of resources of several services implemented at a provider network 1502—a multi-tenant data storage service 1540, a query acceleration service 1520 and a virtual computing service 1510. A given customer of the data storage service may store a respective set of data item collections 1545 (such as collections 1545A and 1545B) associated with one or more applications at the storage service 1540, e.g., using a set of storage nodes shared by multiple customers as was discussed in the context of FIG. 1. Examples of data item collections in various embodiments may include relational or non-relational database tables (such as tables C1-T1 and C1-T2 of customer C1 in FIG. 1), collections of unstructured data objects accessible via web services interfaces, or other groups of items or records, depending on the specifics of the data model being implemented at the storage service.

Client-side components 1593 (e.g., 1593A or 1593B associated with customers C1 and C2 respectively) of the applications may issue read and write requests directed to the data items of collections 1545 from guest virtual machines of the virtual computing service 1510 in the depicted embodiment. At least some of the I/O requests may be directed to a single-tenant query accelerator node fleet 1522 (e.g., fleets 1522A or 1522B set up on behalf of customers C1 and C2 respectively) instead of being sent directly to the storage service 1540. Each query accelerator fleet (QAF) 1522 may comprise a selected number of query accelerator nodes (QANs), such as QAN 1580A of QAF 1522A and QAN 1580K of QAF 1522B. The query accelerator nodes may act as intermediaries between the client-side components and the back-end storage service. Each QAN 1580 comprises a query processing engine (QPE) 1581 (e.g., 1581A or 1581K), a local data cache 1583 (e.g., 1583A or 1583K), and a write coordinator 1584 (e.g., 1584A or 1584B) responsible for propagating client-submitted writes to the data storage service 140. The term "back-end write" may be used herein to refer to the writes directed from the QAF layer to the storage service, e.g., corresponding to write requests submitted by client-side components to the QAF layer. In the depicted embodiment, the write coordinators 1584 are shown as subcomponents of the query processing engines 1581. In other embodiments, the write coordinators may be implemented as components that need not be incorporated within the query processing engines. Code generators for executable query modules and query code caches (similar to those discussed in the context of FIG. 1) may also be implemented at the QANs 1580 in at least some embodiments.

In the embodiment depicted in FIG. 15, at least some of the data item collections 1545 may have associated provisioned throughputs 1546. When a data item collection is created at the request of a customer of storage service 1540, a provisioned throughput 1546, selected by the customer or by the service, may be designated for the collection. The provisioned throughput may indicate the rate of I/O operations that are to be supported by the storage service for the item collection. The storage service 1540 may allocate resources (e.g., storage devices, network bandwidth and the like) for a given data item collection 1545 in such a way that the probability of not being able to support the provisioned throughput is extremely low. In some embodiments, respective provisioned throughputs 1546 may be set for reads versus writes. In one implementation, the provisioned throughputs may be expressed in I/O-size dependent units termed read capacity units and/or write capacity units. For example, in one embodiment a read capacity unit may correspond to one read per second for data items up to X kilobytes in size (with additional capacity units required for reading items greater than X kilobytes in). The total number of read capacity units required for a given item collection may depend on the data item size, and in some cases in which the storage service supports alternative consistency levels (such as strong consistency or eventual consistency) also on the consistency level required for the reads. Similarly, a write capacity unit may represents one write per second for data items up to Y kilobytes in size.

In general, the provisioned throughputs 1546 for different data item collections 1545 may be dynamically modified by the customers on whose behalf the collections are established. In at least some embodiments, the provisioned throughputs at the back-end data stores may be designated independently of the performance targets for the QAFs. For example, the provisioned throughput for a collection 1545A may be set to 100 reads or writes per second, but the query acceleration service 1520 may be configured (e.g., at the customer's request) to support 1000 reads or writes per second at a given QAN. Because the throughputs intended to be supported at the QAF layer may not match the provisioned throughputs of the data item collections 1545, and because a given QAF may in general be configured to accept requests directed at multiple data item collections, the rate at which writes are propagated to the storage service may have to be managed intelligently in the depicted embodiment, e.g., by the write coordinators 1584. It is noted that in at least one embodiment, the storage service may not necessarily implement a provisioned throughput model. Even in scenarios in which there are no provisioned throughputs designated for various data item collections, the rate at which the storage service can handle writes may differ from the rate at which the QANs receive write requests, so the write coordinators may still have to impose some constraints on the rates of back-end writes.

Each data item collection 1545 may also have an associated write mode 1547 in various embodiments. Some data item collections such as 1545A may be configured in write-through mode, while others, such as 1545B, may be configured in write-back mode. In the case of a data item collection set up in write-through mode, when a write request 1544 is received at a QAN such as 1580A from a client-side component 1593, the corresponding back-end write 1547 may be performed synchronously in the depicted embodiment. As such, a response to a write request 1544A directed to a write-through data item collection 1545A may not be transmitted to the client-side component 1593A until the write has been successfully applied at the storage service. In contrast, back-end writes 1549 directed to collections such as 154B which have been set up in write-back mode may be performed asynchronously with respect to the write requests 1544B. For example, a response to write request 1544B (which is directed to a write-back mode data item collection 1545B) may be provided by the QAN as soon as some number of operations have been completed at the QAF layer, without requiring the successful completion of the corresponding back-end write 1549. In at least one embodiment, the write mode (write-back or write-through) may be designated at the query accelerator fleet layer for a given data item collection, rather than at the back-end layer: for example, writes to a given table T1 may be processed in write-back mode at one QAF and in write-through mode at a different QAF. In some embodiments only a single write mode (e.g., either write-back or write-through) may be supported.

In the depicted embodiment, a write coordinator 1584 may determine, using one or more message exchanges with the storage service 1540, a throughput limit which should be enforced by the write coordinator for back-end writes directed to data item collections configured in write-back mode. In at least some embodiments, respective limits may be determined for each data item collection for which the QAF is responsible for caching data and/or for implementing queries.

The write coordinator 1584 may implement a technique for asynchronous back-end writes which relies on a persistent journal and a pool of worker threads in at least some embodiments. When a write request to a write-back mode data item collection such as 1545B is received at the write coordinator, a data item entry for the write request may be inserted into the local data cache (and in some cases propagated to other QANs), and a journal entry may be inserted into the write-back journal. The journal entry may serve as an asynchronous work request, to be taken up by one of the write-back worker threads of the pool. The pool of write-back worker threads may be established to examine entries of the persistent write-back journal to identify outstanding writes which have not yet been propagated to the storage service, and initiate corresponding back-end write requests. The number of threads instantiated may be selected based at least in part on the write throughput limit(s) which have been determined by the write coordinator. A number of additional details regarding the operations which may be performed by the write coordinator and the write-back threads in various embodiments are provided below. For example, in some embodiments the write-back threads may also utilize a capacity indicator such as a token bucket to determine whether a given outstanding write to the back-end storage service should be scheduled or deferred.

Write-Back Journal and Worker Thread Pool

Figure 16:
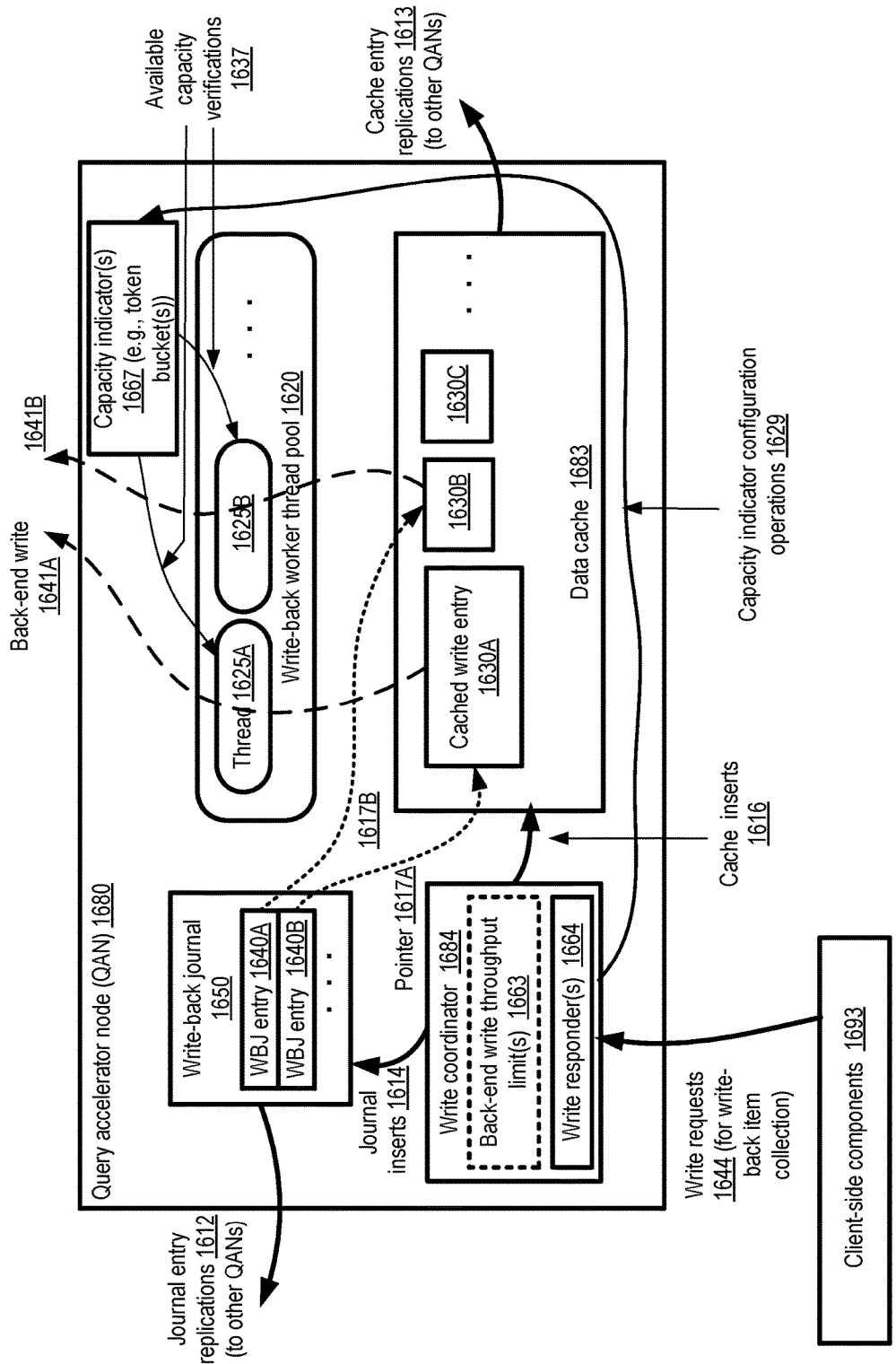
FIG. 16 illustrates an example query accelerator node at which a pool of write-back threads may be instantiated, according to at least some embodiments.

FIG. 16 illustrates an example query accelerator node at which a pool of write-back threads may be instantiated, according to at least some embodiments. The write coordinator 1684 at the QAN 1684 may determine, e.g., using a protocol which involves the exchange of some number of messages with a back-end data store, respective limit(s) 1663 for back-end writes directed to various data item collections for which the QAN 1684 is configured. A number of factors, examples of which are discussed below in the context of FIG. 18, may be taken into account to arrive at the limits 1663 in various embodiments. The write coordinator 1684 may establish a pool 1620 of write-back worker threads 1625 (e.g., 1625A and 1625B), with the size of the pool being determined based at least in part on the write throughput limits 1663.

A client-side component 1693 may submit a write request 1644 directed to a particular data item collection which is configured in write-back mode to query accelerator node 1680. In response to the receipt of the write request, a new journal entry 1640 (e.g., 1640A or 1640B) may be inserted into a local write-back journal 1650 in the depicted embodiment, as indicated by arrow 1614, and a cached write entry 1630 (e.g., 1630A, 1630B or 1630C) representing the modifications requested by the client-side components may be inserted into local data cache 1683. In the depicted embodiment, the write coordinator may comprise one or more write responder subcomponents 1664 (e.g., respective threads of execution) which receive write requests, generate the journal and cache entries, and provide responses to the client-side components. In some embodiments, the journal 1650 may comprise several partitions, with a target partition for a given entry being selected based on any of various factors such as the particular data item collection (e.g., table identifier) to which the write request is directed, the particular data item (e.g., table record) to which the write request is directed, the number of write-back threads instantiated, etc. Each write-back journal (WBJ) entry 1640 in the journal 1650 may include a respective pointer to the corresponding write cache entry, such as pointers 1617A and 1617B of journal entries 1640A and 1640B. In some embodiments, the write cache entries 1617 and/or the write-back-journal entries 1640 may be replicated at other QANs of the fleet (as indicated by arrows 1613 and 1612). In at least one embodiment, the successful replication of the journal entry and/or the cached write entry at some selected number of QANs may be required before a completion response corresponding to a write request is provided to the client-side component 1693. In some implementations, the number of required replicas of write-back journal entries or cache entries may be configurable at the QAF level and/or at the data item collection level. Thus, for example, with respect to a particular table T1 being cached at a query accelerator fleet QAF1, at least two replicas of the entries may be required before a response indicating success is provided to a client-side component's write request, while for a different table T2 being cached at QAF1, at least three replicas may be required at respective QANs.

Each write-back thread 1625 may be responsible for examining the write-back journal 1650, identifying outstanding writes for which the thread 1625 is responsible, and issuing the corresponding back-end writes 1641 (e.g., 1641A or 1641B) to the data stores associated with the QAN 1680. After the back-end write completes successfully, the journal entry may be deleted in the depicted embodiment, e.g., by the write-back thread 1625 which verified the success of the back-end write. In some embodiments, each thread 1625 may be responsible for propagating the writes indicated in a respective partition of the journal 1650. As discussed below in further detail in the context of FIG. 19, the journal entries for a particular data item collection may be stored contiguously within journal 1650 in some embodiments, enabling a write-back thread 1625 to combine multiple back-end writes into a single message to the data store layer in some cases. It is noted that in one embodiment in which the cached data at the QANs is stored in binary encoding format (as discussed in the context of FIG. 1), the write-back threads may be responsible for transforming the cached writes into the encoding used at the data store layer (if it differs from the encoding used at the query accelerator layer).

In at least one embodiment, an additional mechanism for dynamically rate-limiting the back-end writes 1641 may be implemented. Respective dynamic capacity indicators 1667 such as token buckets may be initialized, e.g., by the write coordinator (as indicated by arrow 1629) based on the write throughput limits 1663 for one or more data item collections. Before submitting a given back-end write, a write-back thread 1625 may verify that the back-end has sufficient capacity available using the indicators, as indicated by arrows 1637. For each submitted back-end write, the remaining available capacity at indicators 1667 may be reduced. The available capacity may be increased based on a refill rate setting corresponding to the most recent write throughput limit—e.g., if the write throughput limit is 100 writes per second for a particular table, a corresponding token bucket may be refilled at the rate of 10 tokens every 100 milliseconds (up to a maximum bucket population of 100). In some embodiments, write capacity indicators may not be used.

Several of the properties of the environment illustrated in FIG. 16 may be modified dynamically. For example, the throughput limits 1663 may be refreshed periodically or in response to certain triggering events, the number of back-end threads in pool 1620 may be increased or decreased in response to changes in the throughput limits or in the number of data item collections being cached at QAN 1680, the parameters of the dynamic capacity indicators 1667 may be modified over time, and so on.

Write Throughout Limit Determination

Figure 17:
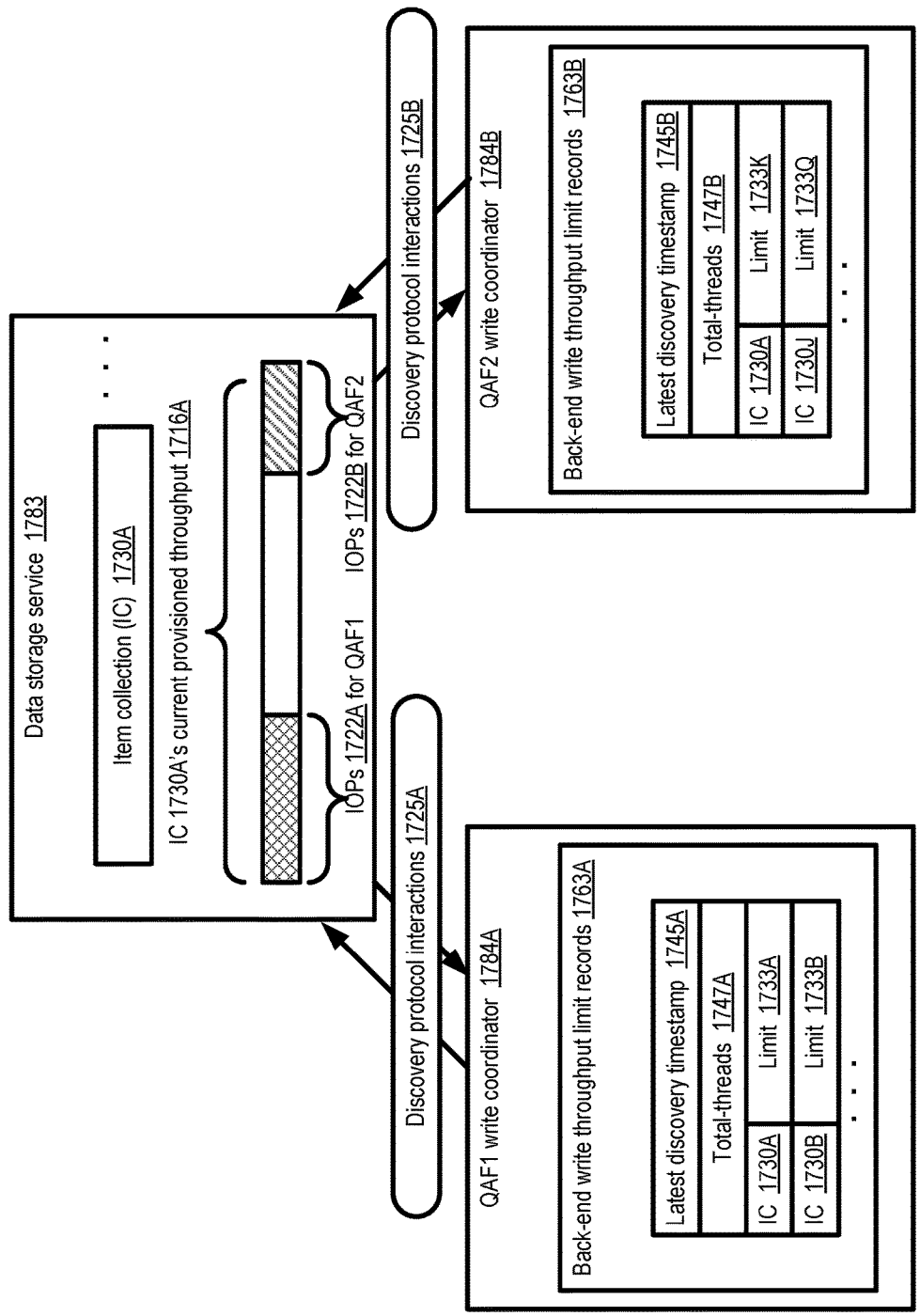
FIG. 17 illustrates an example of a use of a discovery protocol to determine back-end write throughput limits at query accelerator nodes, according to at least some embodiments.

FIG. 17 illustrates an example of a use of a discovery protocol to determine back-end write throughput limits at query accelerator nodes, according to at least some embodiments. In the depicted embodiment, two query accelerator fleets QAF1 and QAF2 may be established, e.g., for different applications whose data set includes a data item collection 1730 of data storage service 1783. At a point of time corresponding to the scenario depicted in FIG. 17, the data item collection 1730A may have a current provisioned throughput 1716A, comprising some number of write IOPs (I/O operations per second). Of that total provisioned capacity, some IOPs 1722A may be usable for the back-end writes submitted from QAF 1722A, while IOPS 1722B may be usable for the back-end writes submitted from QAF 1722B. The division of the provisioned capacity for the different QAFs may be designated by a customer on whose behalf the item collection 1730A is established in some embodiments. In other embodiments, the subdivision of the provisioned capacity may occur organically, e.g., based proportionately on the rates of back-end writes submitted by the two QAFs (and/or on other QAFs or other client-side components which may not necessarily use QAFs).

Write coordinators 1784A and 1784B of QAFs QAF1 and QAF2 may each attempt to discover their write throughput limits using a discovery protocol in the depicted embodiment. The discovery protocol may include the transmission of one or more messages in one or both directions between a given write coordinator 1784 and the storage service 1783. In some embodiments, the interactions 1725 (e.g., 1725A or 1725B) may comprise a straightforward query request and response—e.g., write coordinator 1784A may (either once, or periodically) transmit a message requesting the number of IOPS designated for QAF1, and the storage service 1783 may provide the requested number. In some embodiments, a discovery protocol based on gradually increasing the rate of submitted back-end writes until an error is encountered may be used. For example, the write coordinator 1784 may submit back-end writes at the rate of 10 per second for one second for K seconds, then 20 per second for the next K seconds, then 40 per second for the next K seconds, and so on, until an indication that the storage service cannot sustain writes at the submitted rate is received. The maximum sustainable level based on the gradual increase may be considered the back-end write throughput limit for some period of time (or until additional throttling or error messages are received).

The limits may be re-checked periodically in some embodiments, e.g., once every T seconds. The write coordinators may update their respective back-end write throughput limit metadata records 1763 (e.g., 1763A or 1763B) as and when new information is obtained via the discovery protocol. In the depicted embodiment, the metadata 1763 may include an indication of the most recent timestamp 1745 (e.g., 1745A or 1745B) at which the discovery protocol was executed, the total number of write-back worker threads 1747 (e.g., 1747A or 1747B) instantiated concurrently, and the respective write throughput limits (such as 1733A, 1733B, 1733K or 1733Q) corresponding to respective data item collections 1730 (e.g., 1730A, 1730B, 1730K or 1730Q). In some embodiments, the back-end write throughput information may not necessarily be updated dynamically, at least for some data item collections.

Figure 18:
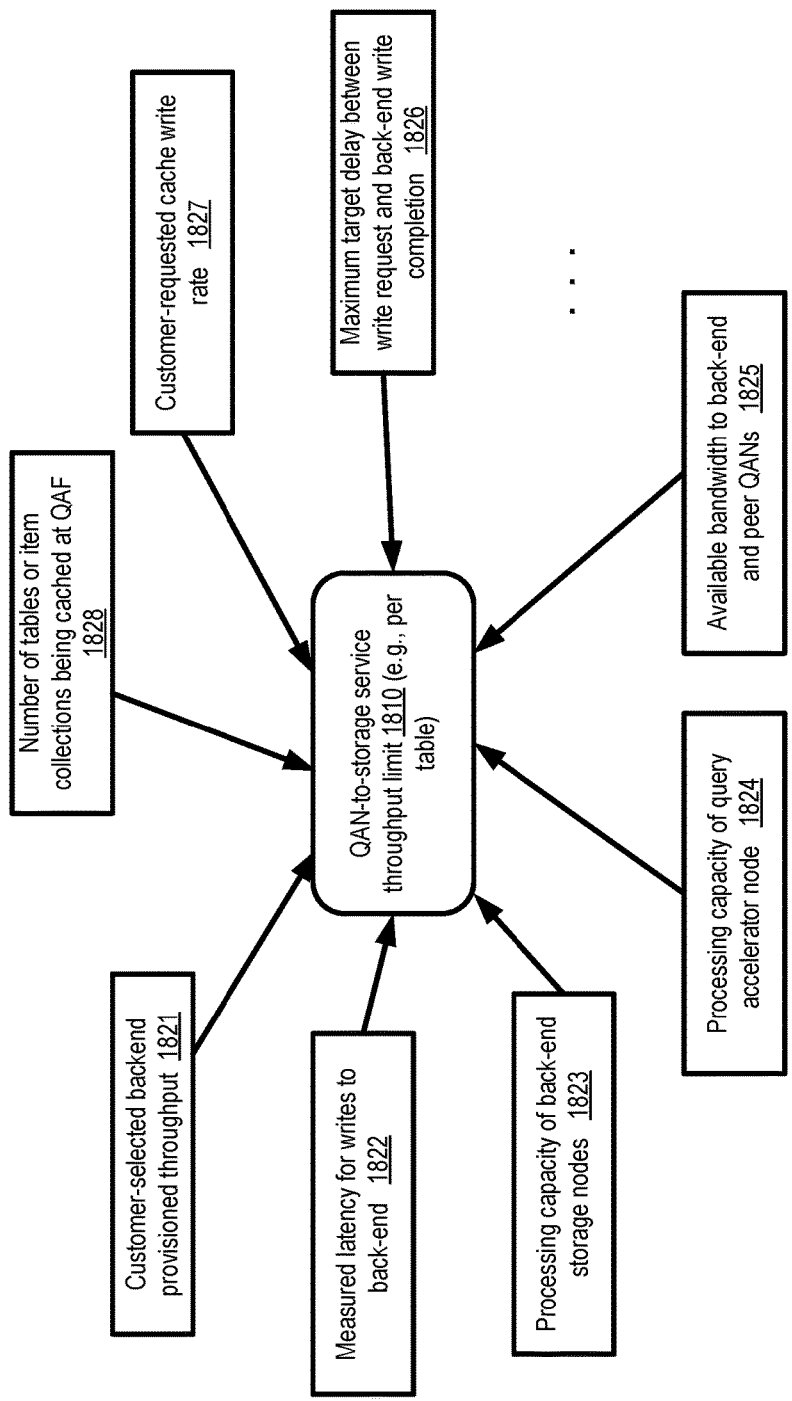
FIG. 18 illustrates example factors that may be used to determine the back-end write throughput limit at a query accelerator node, according to at least some embodiments.

As discussed earlier, in various embodiments at least some QANs may differ in their performance capabilities. In addition, the nodes of the storage service may also differ from one another in their performance capacities. Differences among the nodes at the query accelerator layer and at the back-end storage service may influence the back-end write throughput limits in various embodiments. FIG. 18 illustrates example factors that may be used to determine the back-end write throughput limit at a query accelerator node, according to at least some embodiments. As shown the QAN-to-storage service throughput limit 1810 (e.g., for a given data item collection such as a table) may depend on, among other factors, the processing capacity of the back-end storage nodes 1823 or the processing capacity 1824 of the query accelerator node itself. Storage nodes with higher performance capacities may be able to sustain higher rates of back-end writes, and similarly, QANs with greater processing power may be able to submit back-end writes at higher rates (e.g., by increasing the number of write-back threads). The available bandwidth 1825 to the back-end storage service and/or to peer QANs may affect the back-end write throughput limits in at least some embodiments. The measured latency 1822 for write requests to the back-end from the QAN may be used as a factor to compute or estimate the throughput limits in one embodiment.

As mentioned above, the customer-selected provisioned throughput 1821 may influence the throughput limits. In some embodiments as discussed in the context of FIG. 13, a performance goal may be indicated for a QAF by the customer, and such performance goals may include a write rate 1827 which may be taken into account to determine the write throughput limit. Other factors such as the total number of collections 1828 whose items are being cached at the fleet, and/or a maximum targeted delay 1826 between the submission of a write request and the completion of the corresponding back-end write (which may also be indicated by a customer) may be considered by the write coordinator when computing or determining the write throughput limit in some embodiments. Values associated with some of the factors may change over the lifetime of a given data item collection (e.g., a customer may increase or decrease the provisioned throughput) in which case the write throughout limits may be re-calibrated in at least some embodiments. In some embodiments back-end write throughput limits may be determined at a data store granularity rather than at a per-item-collection granularity—e.g., respective write throughput limits may be determined for each instance of a back-end database based on factors similar to those shown in FIG. 18, rather than for each table of the instance.

Partitioned Write-Back Journal

Figure 19:
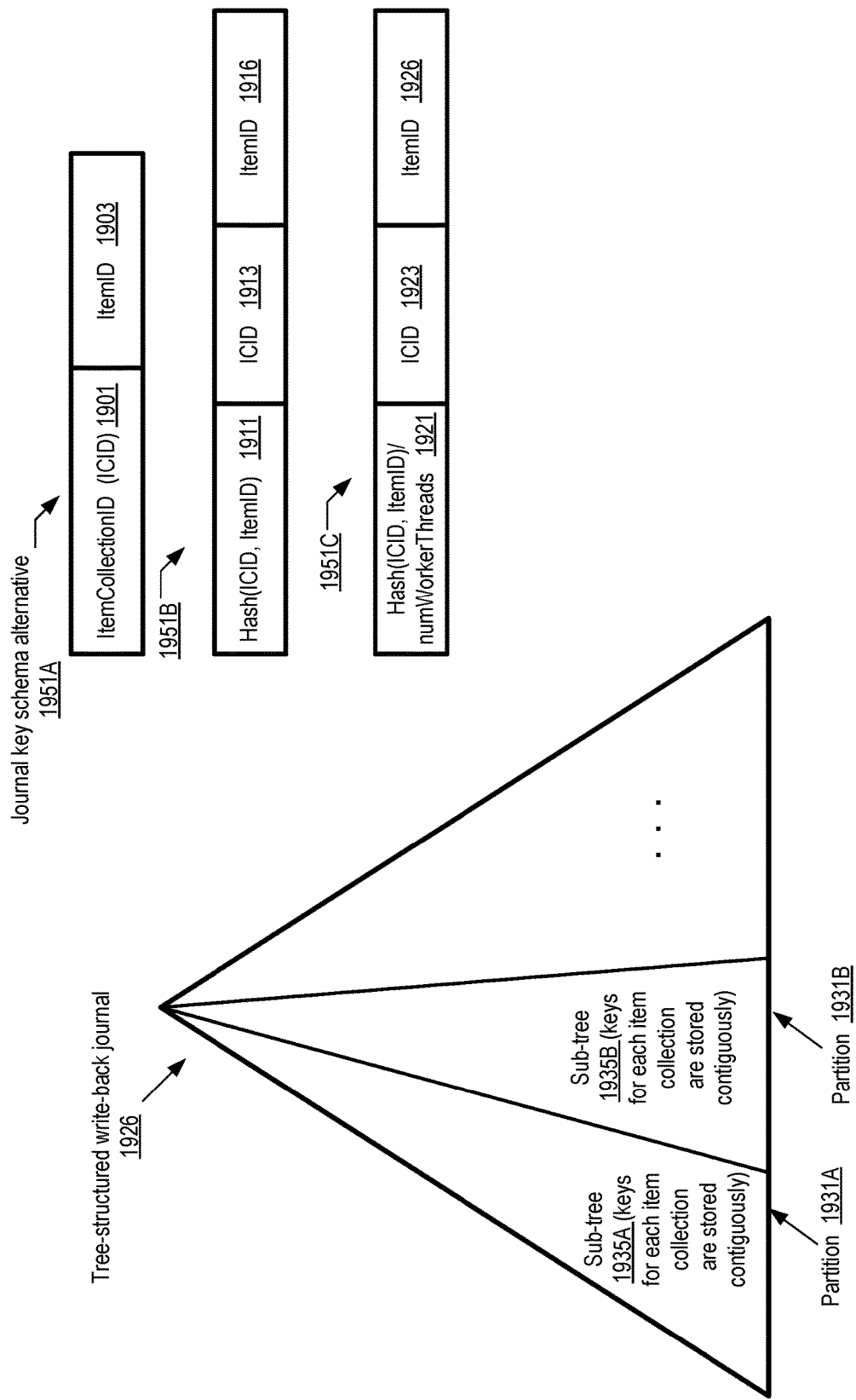
FIG. 19 illustrates examples of key schemas which may be employed at a tree-structured write-back journal, according to at least some embodiments.

FIG. 19 illustrates examples of key schemas which may be employed at a tree-structured write-back journal, according to at least some embodiments. In the depicted embodiment, a tree-structured journal 1929 may be implemented (e.g., using a B-trees, a B+ tree, an R-tree, a 2-3 tree or the like). With the journal, respective subsections within which the journal entries corresponding to a given data item collection (e.g., a given table) are stored contiguously may be used for different journal partitions. For example, in the depicted scenario, sub-trees such as sub-tree 1935A and 1935B may correspond to journal partitions. Within a given sub-tree 1935, journal entries for several different item collections may be stored, with the entries for a given collection (e.g., entries for different records or rows of a given table) being stored contiguously. In at least some embodiments, entries for a given item collection may be distributed among several different partitions. In implementations in which individual sub-trees or partitions are assigned to a respective write-back thread, storing the entries for a given item collection contiguously may enable optimizations such as combining several back-end writes in a single message, combining several back-end writes directed to the same data item into a single back-end write, and so on. Other journal structures which may not be tree-based, but may nevertheless support ordering of journal entries based at least in part on the respective object collections to which the corresponding writes are directed (so that at least some of the journal entries for a given object collection are stored contiguously) may be implemented in different embodiments. In at least one embodiment the entries for a given item collection need not necessarily be stored contiguously.

In various embodiments, a number of different approaches may be taken with respect to the key schema used for the journal entries. Three example approaches are shown in FIG. 19. In alternative 1951A, the key consists of an item collection identifier (e.g., a table identifier) 1901 followed by a data item identifier 1903 (e.g., a row or record identifier). In alternative 1951B, the key consists of a randomized hash value 1911 obtained from the combination of the item collection identifier and the data item identifier, followed by the collection identifier 1913 and the data item identifier 1915. In alternative 1951C, the keys may take the number of write-back threads into account. The randomized hash value obtained from the item collection identifier and the item identifier may be divided by the number of threads to obtain the first element 1921 of the key. The remaining elements 1923 and 1925 may comprise the item collection identifier and the data item identifier respectively. Thus, for example, if the hash value is in the range 0-31, and there are 8 write-back threads, element 1921 may take on the values 0-7, with one value of the eight possible values of element 1921 assigned per thread.

Token Buckets

Figure 20:
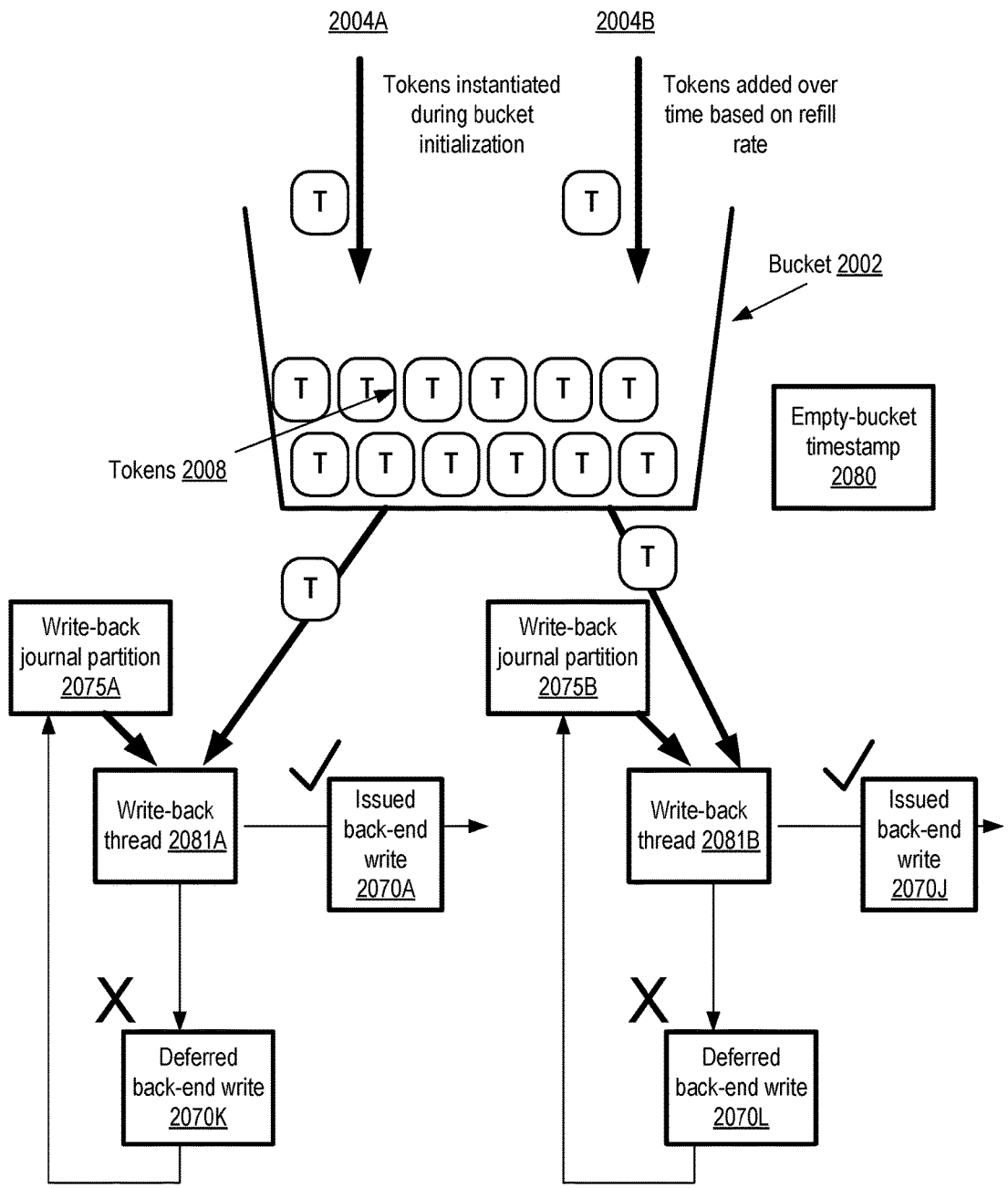
FIG. 20 illustrates an example of a token bucket which may be used as a capacity indicator to limit the rate at which back-end writes are submitted by write-back threads at a query accelerator node, according to at least some embodiments.

As mentioned in the context of FIG. 16, in some embodiments dynamically-adjusted capacity indicators may be used to rate-limit back-end writes. FIG. 20 illustrates an example of a token bucket which may be used as a capacity indicator to limit the rate at which back-end writes are submitted by write-back threads at a query accelerator node, according to at least some embodiments. A mechanism that uses a single bucket 2002 of tokens is illustrated for simplicity of presentation. Combinations of multiple buckets may be used in some embodiments, such as one or more buckets per data item collection. According to the mechanism, a bucket 2002 (e.g., a logical container which may be implemented as a data structure within a software program in at least some embodiments) set up for limiting back-end write submission rates may be populated with an initial set of tokens 2008 during bucket initialization, as indicated via arrow 2004A. The initial population may be based at least in part on the back-end throughput limit or limits determined or estimated by the write coordinator at the QAN where the bucket is implemented.

The use of token bucket 2002 by two write-back threads 2081 (2081A and 2081B) is shown in the depicted embodiment. When a thread 2081 identifies an outstanding write in its write-back journal partition 2075 (e.g., partition 2075A in the case of thread 2081A, and partition 2075B in the case of thread 2081B), the thread checks token bucket 2002 to determine whether a token 2008 is available. If a token is available, a back-end write corresponding to the journal entry may be issued (elements 2070A or 2070J), the bucket's token population may be reduced by one, and the journal entry may be deleted in at least some embodiments. If no token is available, the write may be deferred (elements 2070K or 2070L) and the journal entry may be retained. In some embodiments, each token 2008 may correspond to an amount of data being written—e.g., one token may be needed for a write of up to four kilobytes, two tokens may be needed for a write of up to eight kilobytes, and so on. The token bucket 2002 may have an associated refill rate, which may be used to add new tokens periodically up to some maximum token population, as indicated by arrow 2004B.

In some implementations, token refill operations may accompany, or be performed in close time proximity to, token consumption operations—e.g., within a single software routine, a token may be consumed for issuing a back-end write, and M tokens may be added based on the refill rate and the time since the bucket was last refilled. Limits may be placed on the maximum number of tokens a bucket may hold in some embodiments, and/or on the minimum number of tokens, e.g., using respective configuration parameters.

In one simple example scenario, to support a steady load of 100 back-end writes per second, bucket 2002 may be configured with an initial population of 100 tokens, a maximum allowable population of 100 tokens and a minimum of zero tokens. The refill rate may be set to 100 tokens per second, and one token may be added for refill purposes (assuming the maximum population limit is not exceeded) once every 10 milliseconds. If a steady state workload of 100 writes per second, uniformly distributed during each second, is experienced at the QAN, the refill rate and the write request rate may balance each other. Such a steady-state workload may be sustained indefinitely in some embodiments, given the bucket parameters listed above. If, extending the above example, the arrival rate and/or the refill rate is not uniform, scenarios may arise in which the bucket 2002 remains empty for some (typically small) time intervals (e.g., if some set of requests in rapid succession consume more tokens than the refill mechanism is able to replace). In some embodiments, burst-handling techniques may be employed: e.g., additional token buckets for handling temporary bursts of requests may be used.

In the depicted embodiment, the QAN may maintain an empty-bucket timestamp 2080, indicating the last time that the bucket was found to be empty when an outstanding write was identified in the journal. Such a timestamp may be used to temporarily defer additional attempts to issue back-end writes in some embodiments. For example, if a write-back thread identifies a new outstanding write within X milliseconds of the empty-bucket timestamp, the thread may suspend itself for Y milliseconds, or processor other outstanding writes for Z milliseconds before attempting to schedule the deferred write. This may be done on the assumption that an empty bucket indicates an unusually high rate of writes has been attempted, so a pause in additional writes may be appropriate. In some embodiments, token buckets may be set up for individual data item collections. In at least one embodiment, a similar capacity indicator may be used to limit the rate at which reads are issued to back-end data stores from a QAN.

Smoothing Non-Uniform Write Request Arrivals

Figure 21:
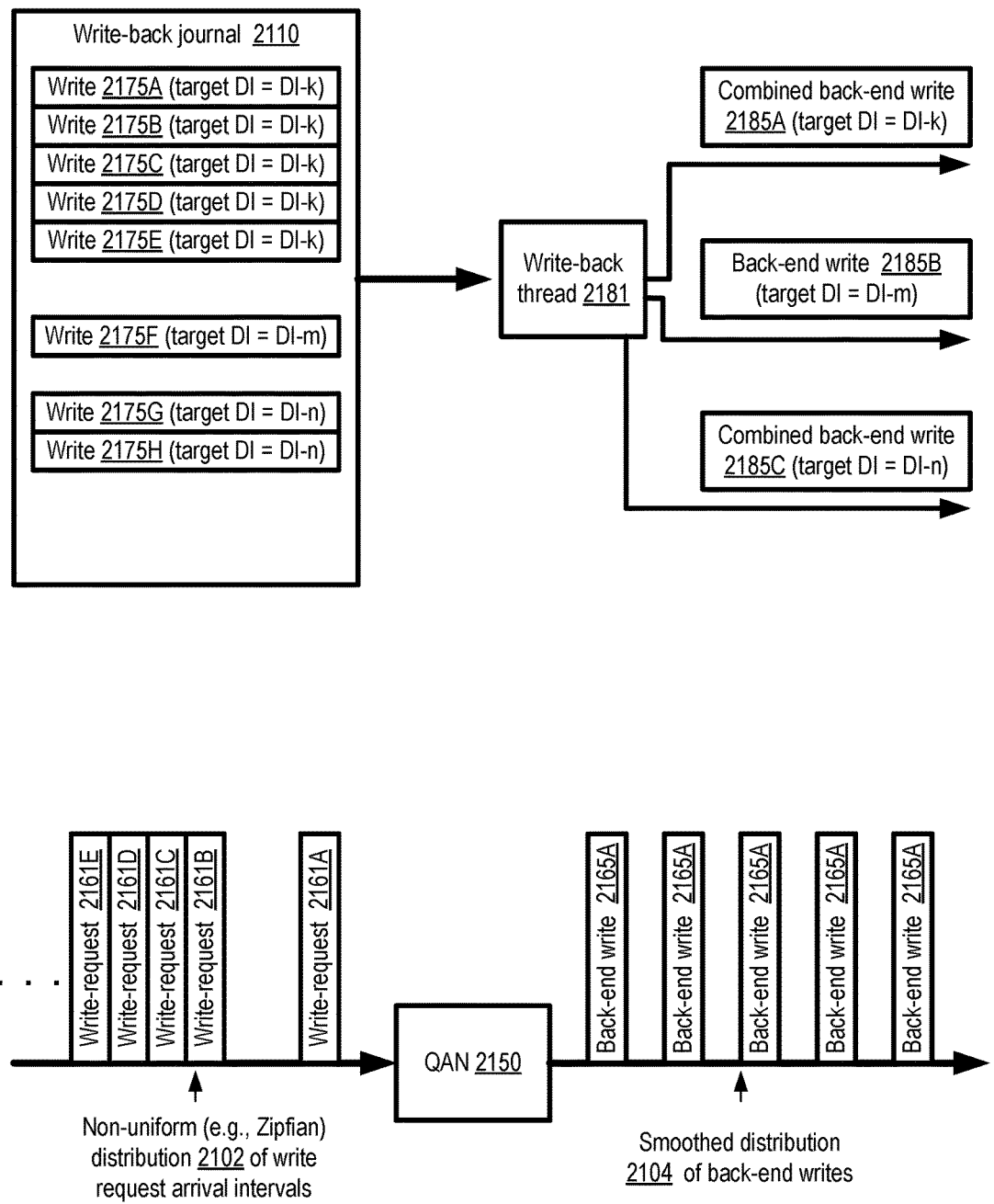
FIG. 21 illustrates examples of combining multiple cached writes into a single back-end write at a query accelerator node, according to at least some embodiments.

FIG. 21 illustrates examples of combining multiple cached writes into a single back-end write at a query accelerator node, according to at least some embodiments. In the depicted embodiment, multiple writes may sometimes be directed to the same data item in quick succession by client-side components. Thus, for example, write-back journal 2110 contains five separate entries 2175A-2175E for writes directed to data item DI-k, one entry 2175F for a write directed to data item DI-m, and two entries 2175G and 2175H directed to data item DI-m. Write-back thread 2181, responsible for propagating the writes to DI-k, DI-m and DI-n, may combine the outstanding writes for each data item into a single back-end write. For example, back-end write 2185A may represent the net effect on DI-k of all five outstanding writes represented by entries 2175A-2175E. Similarly, back-end write 2185C may represent the net effect on DI-n of outstanding writes represented by entries 2175G-2175H. Depending on the semantics of the writes implemented in different embodiments, the net effect of a set of several different write requests may simply be the equivalent of issuing only the most recent write of that set. In other embodiments, individual writes may be directed to different elements of data items (e.g., one write may modify only column A of a row, another may modify only column B, and so on), so combining several different writes may require determining the most recent writes to each element. Back-end write 2108B may incorporate the modifications corresponding to journal entry 2175F.

In various embodiments, the introduction of the query accelerator layer as an intermediary between the client-side components and the back-end data stores may result in several types of workload transformations. For example, a non-uniform distribution 2102 of write requests 2161A-2161E (with respect to inter-request arrival times) may be experienced at a QAN 2150, as shown in FIG. 21. The corresponding back-end writes 2165A-2165B, however, may be distributed more uniformly over time, resulting in a more smoothed distribution 2104 of writes at the back-end than the request arrival distribution at QAN 2150. Some back-end data stores may have been designed to work best in environments in which storage requests are uniformly distributed, so the smoothing of workload patterns resulting from the use of query accelerator fleets may lead to better performance overall at the data stores. In at least some embodiments, the time interval between the receptions of two write requests at a QAN may not necessarily match the time interval between the transmissions of the corresponding back-end write requests. For example, two write requests WR1 and WR2 may be received at times T1 and (T1+delta1) respectively, the back-end write BEW1 corresponding to WR1 may be transmitted at time T2, and the back-end write BEW2 corresponding to WR2 may be transmitted at time (T2+delta2), where delta2 differs from delta1. In one embodiment, the order in which writes are applied at the back-end may not necessarily correspond to the order in which the write requests are received at the QAN. For example, it may be the case that a write request WR2 is received after write request WR1, but back-end write BEW2 corresponding to WR2 is submitted (and/or completed) before back-end write BEW1 corresponding to WR1.

Methods for Supporting Write-Back Mode

Figure 22:
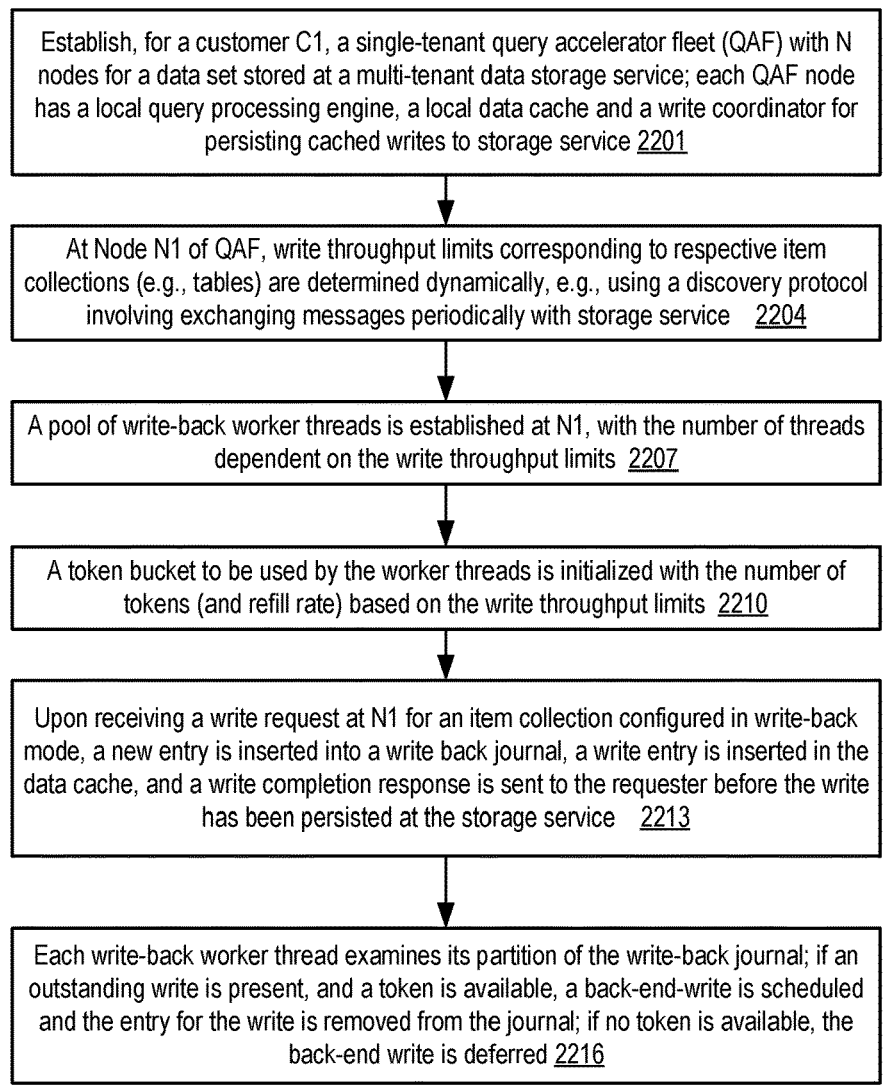
FIG. 22 is a flow diagram illustrating aspects of operations that may be performed at a query acceleration service to implement a write-back policy for cached writes, according to at least some embodiments.

FIG. 22 is a flow diagram illustrating aspects of operations that may be performed at a query acceleration service to implement a write-back policy for cached writes, according to at least some embodiments. As shown in element 2201, a single tenant fleet of query accelerator nodes may be established for a data set stored at a multi-tenant storage service on behalf of a customer C1. Each query accelerator node may comprise at least a local data cache, a query processing engine and a write coordinator responsible for propagating or persisting cached writes to the storage service. At a given node N1 of the fleet, respective write throughput limits for back-end writes (i.e., writes from the node to the storage service) for various data item collections such as tables may be determined (element 2204). A number of factors may influence the throughput limits, as discussed earlier, including for example the performance capabilities of the service's storage nodes and N1 itself, the provisioned throughputs designated for different item collections, and so on. A discovery protocol involving the flow of one or more messages between the storage service and N1 may be used to determine the throughput limits in some embodiments.

A pool of write-back worker threads may be established at N1, e.g., by the write coordinator, with the number of threads based at least in part on the throughput limits (element 2207). In the depicted embodiment, one or more token buckets may be initialized at N1 as indicators of available capacity for back-end writes, with the number of tokens and refill rate also being based at least in part on the throughput limits (element 2210).

When a write request directed at a data item collection configured in write-back mode is received at N1, a local data cache entry indicating the contents or modifications of the write request is created, and a corresponding journal entry (pointing to the data cache entry) is added to a write-back journal (element 2213). A write completion response to the request may be provided before the write has been materialized or persistent at the storage service. In some embodiments, for at least some item collections the replication of the journal entry and/or the cached write contents at one or more other query accelerator nodes than N1 may be required before the write completion response is generated. One of the write-back threads may examine the journal (e.g., asynchronously with respect to the insertion of the journal entry) and identify (based on the inserted journal entry) an outstanding write for which a back-end write is to be issued. As shown in element 2216, if the token bucket has sufficient tokens, the write-back thread issues a back-end write in the depicted embodiment and deletes the journal entry; otherwise the back-end write may be deferred.

It is noted that in various embodiments, at least some operations other than those illustrated in the flow diagrams of FIG. 14 and FIG. 22 may be used to implement the query acceleration and write-back related techniques described above. Some of the operations shown may not be implemented in some embodiments or may be implemented in a different order, or in parallel rather than sequentially.

Use Cases

The techniques described above, of optimizing various data access and manipulation operations using a query accelerator fleet for a multi-tenant storage service may be useful in a number of scenarios. As customers of multi-tenant data storage services develop more and more sophisticated applications, the ability to set up single-tenant accelerator fleets and customize the configurations of the fleet nodes may enable a tighter alignment of resources to specific application requirements than may have been possible using the multi-tenant service alone. The use of binary encodings for data items at the query accelerator fleet may help speed up the processing of many types of client requests and internal tasks, including projection-type queries, multi-attribute queries, data item comparisons, and secondary index updates. The implementation of write-back using pools of worker threads and a partitioned write-back journal may enable the query accelerator layer to handle mismatches between the write processing capabilities of the storage service and the demands of customers in a scalable and efficient manner.

Illustrative Computer System

Figure 23:
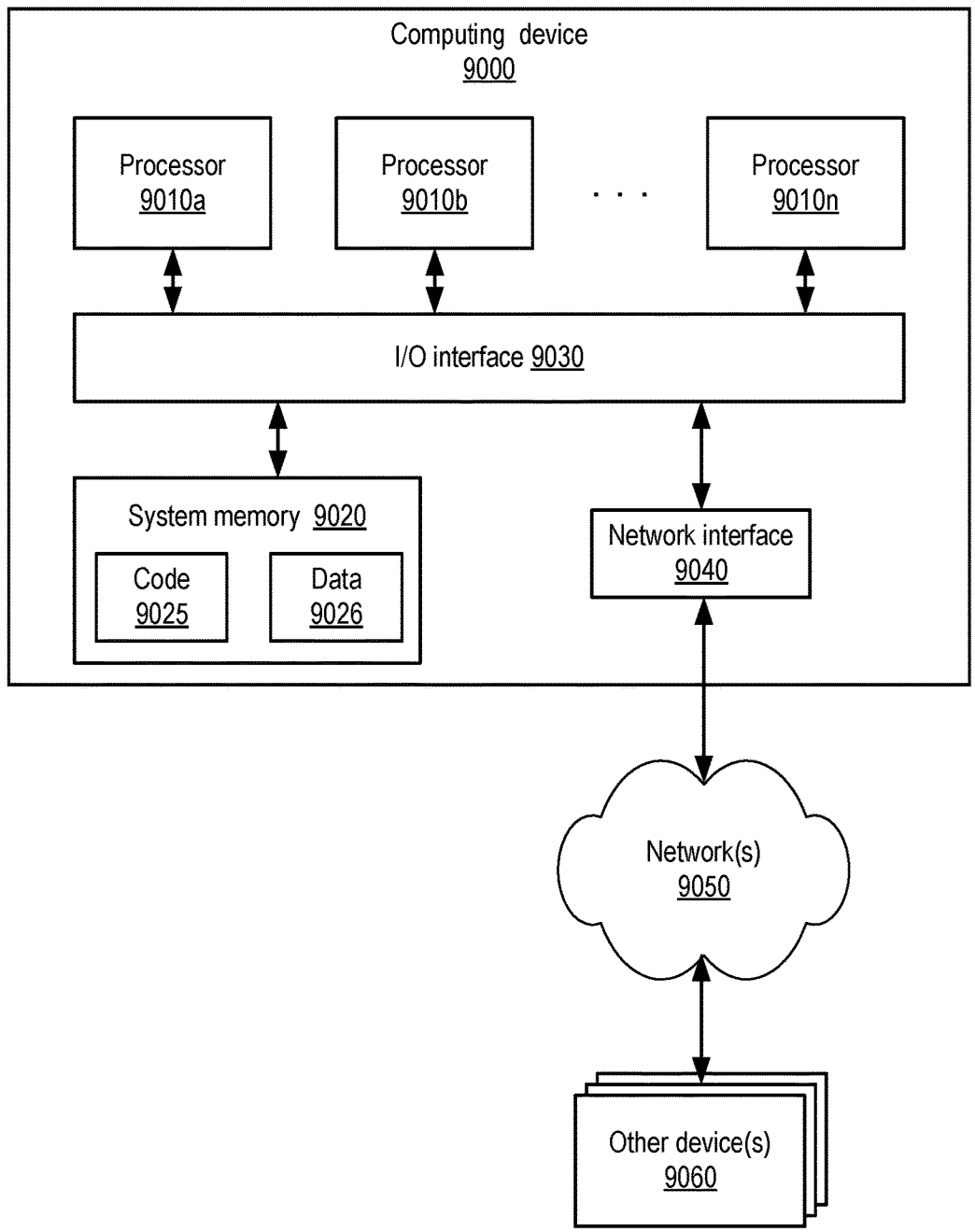
FIG. 23 is a block diagram illustrating an example computing device that may be used in at least some embodiments.

In at least some embodiments, a server that implements a portion or all of one or more of the technologies described herein, including the techniques to implement query accelerator nodes, storage service nodes, client-side components, and the like may include a general-purpose computer system that includes or is configured to access one or more computer-accessible media. FIG. 23 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 22, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 22 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 23 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more query accelerator nodes associated with a first data store of a provider network, including a first query accelerator node implemented at least in part at a first computing device; and
   one or more storage nodes of the first data store, including a first storage node;
   wherein the first query accelerator node is configured to:
      obtain a representation of a first data item, wherein the first data item comprises one or more top-level attributes;
      store, at the first query accelerator node, a first metadata record indicative of (a) names of the one or more top-level attributes and (b) a relative positioning of values of the one or more top-level attributes; and
      insert, in a local data cache, a binary encoding of the first data item, wherein the binary encoding (a) includes an identifier of the first metadata record and (b) does not include names of the one or more top-level attributes;
      store, in a local query code cache, a first executable code component generated to obtain a result of a particular query from the local data cache, wherein the particular query is directed to at least the first data item;
      store, at the first query accelerator node, a second metadata record indicating that the first executable code component is associated with (a) a normalized representation of the particular query and (b) the first metadata record; and
      in response to determining that a second query meets a matching criterion with respect to the second metadata record, utilize the first executable code component to obtain a result of the second query; and
   wherein the first storage node is configured to:
      store, at a storage accessible from the storage node, a different encoding of the first data item.

2. The system as recited in claim 1, wherein the one or more top-level attributes include a first attribute and a second attribute, wherein the first query accelerator node is configured to:
   determine, using the first metadata record, relative positions of the first and second attributes within the binary encoding;

skip over at least a portion of the binary encoding to obtain a value of the second attribute without obtaining a value of the first attribute; and generate a response to a third query using the value of the second attribute.

3. The system as recited in claim 1, wherein the first query accelerator node is configured to:
in response to determining that a second data item is to be compared with a third data item,
initiate a byte-level comparison between respective binary encodings of the second data item and the third data item, without extracting attribute values from the respective binary encodings, wherein the respective binary encodings are stored in the local data cache; and
determine, using a result of the byte-level comparison, whether an attribute-level comparison is to be performed.

4. The system as recited in claim 1, wherein the first query accelerator node is configured to:
in response to determining that an index is to be generated for a collection of data items including the first data item,
store, in the local query code cache, a second executable code component generated to produce a binary encoding of a respective index entry corresponding to individual data items of the collection;
utilize the second executable component to produce a binary encoding of a particular index entry corresponding to a particular data item of the collection; and
store, in the local data cache, the binary encoding of the particular index entry.

5. The system as recited in claim 1, wherein the one or more top-level attributes include a first attribute followed by a second attribute, wherein the first query accelerator node is configured to:
in response to determining that a second data item comprises the second attribute followed by the first attribute, wherein a set of distinct attributes of the first data item matches a set of distinct attributes of the second data item,
store a different metadata record indicative of (a) names of the one or more attributes of the second data item and (b) the order in which the first and second attributes appear within the second data item; and
utilize the different metadata record to respond to a query directed to the second data item.

6. A method, comprising:
performing, by a first query accelerator node of a fleet of one or more query accelerator nodes established for a first data store, wherein the first query accelerator node is implemented at least in part at a first computing device:
storing a first metadata record indicative of (a) names of one or more attributes of a first data item of the first data store and (b) storage position information of the one or more attributes;
storing, in a local data cache, a binary encoding of the first data item, wherein the binary encoding includes an identifier of the first metadata record;
in response to receiving a particular query, wherein the particular query is directed to one or more data items including the first data item, storing, in a local query code cache, a first executable code component that when executed obtains a result for the particular query from the local data cache;

storing, at the first query accelerator node, a second metadata record indicating that the first executable code component is associated with (a) a normalized representation of the particular query and (b) the first metadata record; and
in response to determining that a second query meets a matching criterion with respect to the second metadata record, executing the first executable code component to obtain a result for the second query.

7. The method as recited in claim 6, wherein the one or more attributes include a first attribute and a second attribute, the method further comprising performing, by the first query accelerator node:
determining, using the first metadata record, respective positions within the binary encoding of values of the first attribute and the second attribute;
receiving a third query; and
generating a response to the third query, wherein said generating comprises extracting, from the binary encoding of the first data item, a value of the second attribute and skipping over a value of the first attribute within the binary encoding.

8. The method as recited in claim 6, wherein the one or more attributes include a first variable-length attribute, the method further comprising performing, by the first query accelerator node:
storing, in the local data cache, a binary encoding of a second data item, wherein the binary encoding of the second data item includes an identifier of the first metadata record, wherein the identifier of the first metadata record indicates that the second data item includes the first attribute, and wherein a number of bytes used to store a value of the first attribute in the binary encoding of the second data item differs from a number of bytes used to store a value of the first attribute in the binary encoding of the first data item.

9. The method as recited in claim 6, wherein the one or more attributes include a first attribute followed by a second attribute, the method further comprising performing, by the first query accelerator node:
in response to determining that a second data item comprises the second attribute followed by the first attribute, wherein a set of distinct attributes of the first data item matches a set of distinct attributes of the second data item,
storing a different metadata record indicative of names of the one or more attributes of the second data item and the order in which the first and second attributes appear within the second data item; and
utilizing the different metadata record to respond to a query directed to the second data item.

10. The method as recited in claim 6, wherein the binary encoding does not include respective names of the one or more attributes whose names are indicated in the first metadata record, wherein the one or more attributes comprise a first top-level attribute, wherein the first data item comprises a lower-level attribute which is hierarchically contained within the first top-level attribute, wherein the first metadata record does not include a name of the lower-level attribute, the method further comprising performing, by the first query accelerator node:
including, within the binary encoding of the first data item, a name of the lower-level attribute and a value of the lower-level attribute.

11. The method as recited in claim 6, wherein the fleet of one or more query accelerator nodes comprises a second query accelerator node, the method further comprising performing, by the first query accelerator node:
    determining, based on one or more code replication criteria, that the first executable code component is to be stored in a second local query code cache at the second query accelerator node; and
    transmitting the first executable code component to the second query accelerator node.

12. The method as recited in claim 11, further comprising performing, by the first query accelerator node:
    after transmitting the first executable code component to the second query accelerator node, removing the first executable code component from the local query code cache at the first query accelerator node, without notifying the second query accelerator node that the first executable code component is being removed.

13. The method as recited in claim 6, further comprising performing, by the first query accelerator node:
    in response to determining that a second data item is to be compared with a third data item,
        initiating a byte-level comparison between respective binary encodings of the second data item and the third data item, without extracting attribute values from the respective binary encodings, wherein the respective binary encodings are stored in the local data cache.

14. The method as recited in claim 13, further comprising performing, by the first query accelerator node:
    in response to determining, in the byte-level comparison, that content of a particular byte at a particular offset within the binary encoding of the second data item differs from the content of a corresponding byte at the particular offset within the binary encoding of the third data item,
    extracting a first attribute value from the binary encoding of the second data item,
        extracting a corresponding attribute value from the binary encoding of the third data item, and
        comparing the first attribute value and the corresponding attribute value to determine whether the second data item differs from the third data item.

15. The method as recited in claim 6, further comprising performing, by the first query accelerator node:
    in response to determining that an index is to be generated for a collection of data items including the first data item,
        storing, in the local query code cache, a second executable code component generated to produce a binary encoding of a respective index entry corresponding to individual data items of the collection;
        utilizing the second executable component to produce a binary encoding of a particular index entry corresponding to a particular data item of the collection; and
        storing, in the local data cache, the binary encoding of a particular index entry.

16. A non-transitory computer-accessible storage medium storing program instructions that when executed on one or more processors implements a particular query accelerator node of a fleet of query accelerator nodes associated with a data store, wherein the particular query accelerator node is configured to:
    store, in a local data cache, a binary encoding of a first data item, wherein the binary encoding includes an identifier of a metadata record, wherein the metadata record indicates names of one or more attributes of the first data item;
    in response to receiving a particular query directed to one or more data items including the first data item, store, in a local query code cache, a first executable code component that when executed obtains a result for the particular query from the local data cache;
    store, at the particular query accelerator node, another metadata record indicating that the first executable code component is associated with (a) a normalized representation of the particular query and (b) the metadata record; and
    in response to determining that a second query meets a matching criterion with respect to the other metadata record, execute the first executable code component to obtain a result for the second query.

17. The non-transitory computer-accessible storage medium as recited in claim 16, wherein the one or more attributes include a first attribute and a second attribute, wherein the particular query accelerator node is configured to:
    receive a multi-attribute query which comprises a predicate directed to the first attribute and the second attribute; and
    determine, from the binary encoding of the first data item, without extracting a value of the second attribute from the binary encoding, a result of the multi-attribute query.

18. The non-transitory computer-accessible storage medium as recited in claim 16, wherein the binary encoding of the first data item is formatted according to a version of one or more of: (a) Concise Binary Object Representation (CBOR), (b) MessagePack, (c) Binary Javascript Object Notation (BSON), or (d) Universal Binary Javascript Object Notation (UBJSON).

19. The non-transitory computer-accessible storage medium as recited in claim 16, wherein the particular query accelerator node is configured to:
    in response to determining that the first data item is to be written to the data store,
        generate a text encoding from the binary encoding of the first data item, and
        transmit the text encoding to the data store.

20. The non-transitory computer-accessible storage medium as recited in claim 16, wherein the particular query accelerator node is configured to:
    in response to determining that a second data item is to be compared with a third data item, initiate a byte-level comparison between respective binary encodings of the second data item and the third data item, without extracting attribute values from the respective binary encodings, wherein the respective binary encodings are stored in the local data cache.

* * * * *